(12) United States Patent
Matsunaga et al.

(10) Patent No.: US 8,742,040 B2
(45) Date of Patent: *Jun. 3, 2014

(54) SOLID TITANIUM CATALYST COMPONENT, OLEFIN POLYMERIZATION CATALYST, AND OLEFIN POLYMERIZATION PROCESS

(75) Inventors: Kazuhisa Matsunaga, Otake (JP); Kazutaka Tsuru, Yanai (JP); Kazumitsu Kawakita, Iwakuni (JP); Tetsunori Shinozaki, Ichihara (JP)

(73) Assignee: Mitsui Chemicals, Inc., Tokyo (JP)

( * ) Notice: Subject to any disclaimer, the term of this patent is extended or adjusted under 35 U.S.C. 154(b) by 443 days.

This patent is subject to a terminal disclaimer.

(21) Appl. No.: 12/744,760

(22) PCT Filed: Nov. 14, 2008

(86) PCT No.: PCT/JP2008/070781
§ 371 (c)(1), (2), (4) Date: May 26, 2010

(87) PCT Pub. No.: WO2009/069483
PCT Pub. Date: Jun. 4, 2009

(65) Prior Publication Data
US 2010/0305285 A1    Dec. 2, 2010

(30) Foreign Application Priority Data
Nov. 27, 2007    (JP) ............................... 2007-306332

(51) Int. Cl.
*C08F 4/50*    (2006.01)
(52) U.S. Cl.
USPC ....................................................... 526/125.1
(58) Field of Classification Search
USPC ....................................................... 526/125.1
See application file for complete search history.

(56) References Cited

U.S. PATENT DOCUMENTS

| | | | |
|---|---|---|---|
| 4,442,276 A | 4/1984 | Kashiwa et al. | |
| 5,539,067 A | 7/1996 | Parodi et al. | |
| 5,618,771 A | 4/1997 | Parodi et al. | |
| 5,652,303 A | 7/1997 | Ishimaru et al. | |
| 6,194,342 B1 | 2/2001 | Parodi et al. | |
| 6,515,085 B1 | 2/2003 | Parodi et al. | |
| 6,541,582 B1 | 4/2003 | Morini et al. | |
| 6,777,508 B1 | 8/2004 | Parodi et al. | |
| 7,238,758 B2 | 7/2007 | Yoshikiyo et al. | |
| 7,649,062 B2 | 1/2010 | Matsunaga et al. | |
| 2008/0113860 A1 | 5/2008 | Ernst et al. | |
| 2008/0125555 A1* | 5/2008 | Matsunaga et al. | 526/108 |
| 2008/0306228 A1 | 12/2008 | Matsunaga et al. | |
| 2009/0069515 A1 | 3/2009 | Matsunaga et al. | |

FOREIGN PATENT DOCUMENTS

| | | |
|---|---|---|
| EP | 0 585 869 A1 | 3/1994 |
| EP | 1 840 138 A1 | 10/2007 |
| JP | 57-063310 | 4/1982 |
| JP | 58-138715 A | 8/1983 |
| JP | 59-207904 A | 11/1984 |
| JP | 03-007703 | 1/1991 |
| JP | 05-170843 | 7/1993 |
| JP | 2001-114811 | 4/2001 |
| JP | 2002-539298 A | 11/2002 |
| JP | 2003-040918 | 2/2003 |
| WO | WO-00/63261 | 10/2000 |
| WO | WO-01/57099 A1 | 8/2001 |
| WO | WO-02/30998 A1 | 4/2002 |
| WO | WO-2004/016662 A1 | 2/2004 |
| WO | WO 2004/087771 A1 | 10/2004 |
| WO | WO-2004087771 * | 10/2004 |
| WO | WO-2006/077945 A1 | 7/2006 |
| WO | WO 2006/077946 A1 | 7/2006 |

OTHER PUBLICATIONS

Office Action Japanese Patent Application No. 2009-543756 dated Mar. 12, 2013.

* cited by examiner

*Primary Examiner* — Yong Chu
*Assistant Examiner* — Sonya Wright
(74) *Attorney, Agent, or Firm* — Foley & Lardner LLP

(57) ABSTRACT

A solid titanium catalyst component (I) comprising titanium, magnesium, halogen, a specific cyclic ester compound (a) and a specific cyclic ester compound (b), an olefin polymerization catalyst containing this catalyst component (I), and an olefin polymerization process using this olefin polymerization catalyst are disclosed. According to the solid titanium catalyst component, the olefin polymerization catalyst and the process for preparing an olefin polymer of the invention, an olefin polymer having high stereoregularity and a wide molecular weight distribution can be prepared with high activity, preparation of an olefin polymer excellent not only in molding properties such as high-speed streachability and high-speed moldability but also in rigidity becomes possible, and besides, production cost can be reduced.

10 Claims, 1 Drawing Sheet

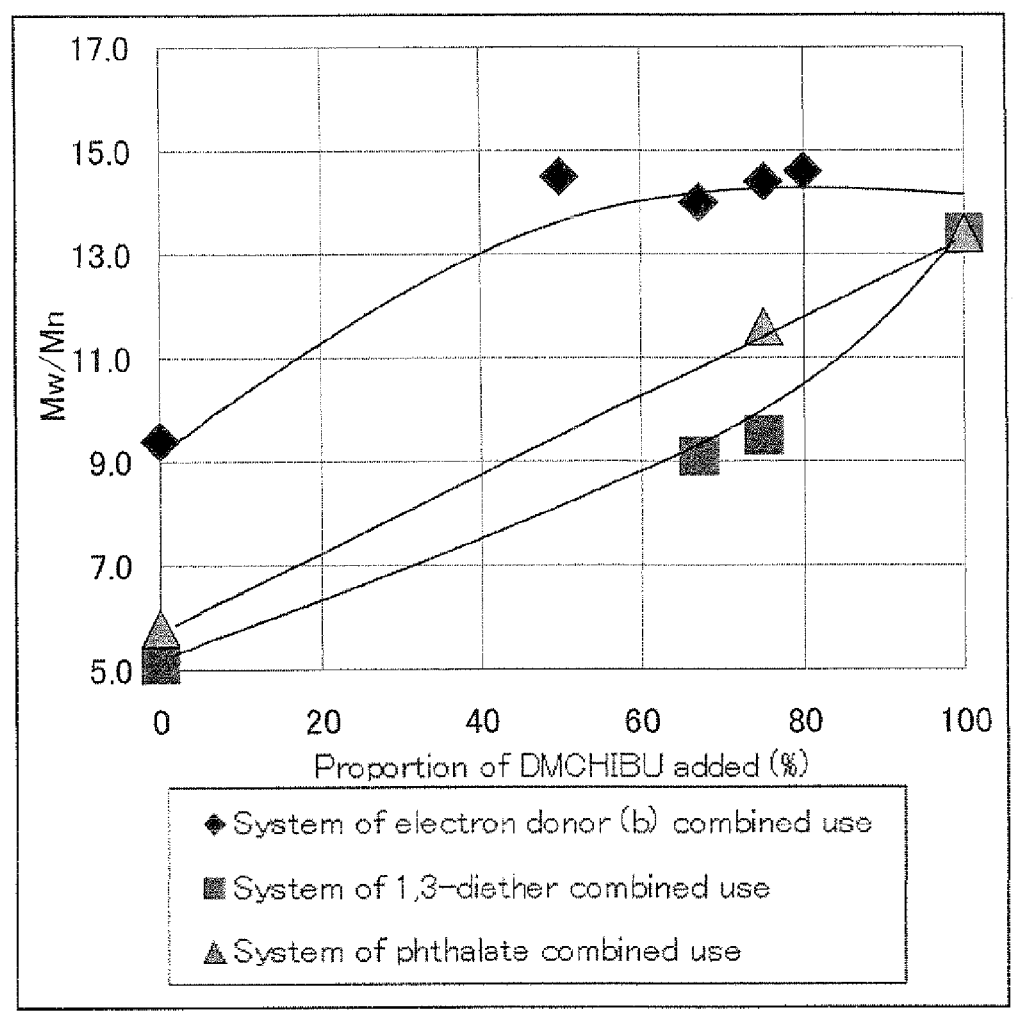

SOLID TITANIUM CATALYST COMPONENT, OLEFIN POLYMERIZATION CATALYST, AND OLEFIN POLYMERIZATION PROCESS

TECHNICAL FIELD

The present invention relates to a solid titanium catalyst component which is preferably used for olefin polymerization, particularly α-olefin polymerization. The invention also relates to an olefin polymerization catalyst containing the solid titanium catalyst component. Further, the invention also relates to an olefin polymerization process using the olefin polymerization catalyst.

BACKGROUND ART

As catalysts used for producing olefin polymers such as a homopolymer of ethylene or an α-olefin and an ethylene/α-olefin copolymer, catalysts containing a titanium compound supported on a magnesium halide in an active state have been known in the past (the term "polymerization" is sometimes used to include copolymerization hereinafter).

As such olefin polymerization catalysts, catalysts containing titanium tetrachloride or titanium trichloride, which are called Ziegler Natta catalysts, and catalysts comprising a solid titanium catalyst component consisting of magnesium, titanium, halogen and an electron donor and an organometallic compound are widely known.

The latter catalysts exhibit high activity not only in polymerization of ethylene but also in polymerization of α-olefins such as propylene and 1-butene. Further, the resulting α-olefin polymers sometimes have high stereoregularity.

It has been reported in Japanese Patent Laid-Open Publication No. 63310/1982 (patent document 1) and the like that among such catalysts, a catalyst using a solid titanium catalyst component in which an electron donor selected from carboxylic acid esters (typical examples: phthalic acid esters) is supported, an aluminum alkyl compound as a co-catalyst component and a silicon compound having at least one Si—OR (wherein R is a hydrocarbon group) exhibits excellent polymerization activity and stereospecificity.

The polymers obtained by the use of the above catalyst often have narrower molecular weight distribution as compared with polymers obtained by the use of Ziegler Natta catalyst. It is known that polymers having narrow molecular weight distribution tend to have "low melt flowability", "low melt tension", "inferior moldability", "slightly low rigidity", etc. On the other hand, from the viewpoints of increase of productivity, cost reduction, etc., various high-speed molding techniques, such as high-speed stretching technique having a purpose of increasing productivity of stretched films, have been developed.

If such polymers having relatively narrow molecular weight distribution as above are intended to be stretched at high speed, neck-in or flapping of a film becomes conspicuous because of shortage of melt tension, and increase of productivity sometimes becomes difficult. Therefore, polymers having higher melt tension have been desired in the market.

In order to solve such problems, there have been made a large number of reports, such as reports on a method of preparing polymers of different molecular weights by multi-step polymerization to widen a molecular weight distribution of a polymer (Japanese Patent Laid-Open Publication No. 170843/1993 (patent document 2)), a catalyst containing plural kinds of electron donors (Japanese Patent Laid-Open Publication No. 7703/1991 (patent document 3)) and a catalyst using a succinic acid ester having asymmetric carbon as an electron donor contained in a solid titanium catalyst component (pamphlet of International Publication No. 01/057099 (patent document 4), pamphlet of International Publication No. 00/63261 (patent document 5), pamphlet of International Publication No. 02/30998 (patent document 6)).

On the other hand, in Japanese Patent Laid-Open Publication No. 114811/2001 (patent document 7) and Japanese Patent Laid-Open Publication No. 40918/2003 (patent document 8), a solid catalyst component for polymerization of olefin(s), which is obtained by bringing a titanium compound, a magnesium compound and an electron donating compound into contact with one another, and a catalyst for polymerization of olefin(s), which contains this catalyst component, are disclosed. As this electron donating compound, a 1,2-cyclohexanedicarboxylic acid ester having a trans purity of not less than 80% is used in the invention described in the patent document 7, and a cyclohexenedicarboxylic acid diester is used in the invention described in the patent document 8. As an example of this cyclohexenedicarboxylic acid diester, only a 1-cyclohexenedicarboxylic acid diester wherein an alkoxycarbonyl group is bonded to the first position and the second position of a cyclohexene ring of 1-cyclohexene is disclosed (paragraphs "0021" to "0024", and working examples). In the patent documents 7 and 8, however, there is no description of molecular weight distribution of an olefin polymer.

The present applicant has disclosed in a pamphlet of International Publication No. 2006/077945 that a solid titanium catalyst component containing a specific cyclic ester compound as an electron donor component gives an olefin polymer having an extremely wide molecular weight distribution (patent document 9).

Patent document 1: Japanese Patent Laid-Open Publication No. 63310/1982
Patent document 2: Japanese Patent Laid-Open Publication No. 170843/1993
Patent document 3: Japanese Patent Laid-Open Publication No. 7703/1991
Patent document 4: pamphlet of International Publication No. 01/057099
Patent document 5: pamphlet of International Publication No. 00/63261
Patent document 6: pamphlet of International Publication No. 02/30998
Patent document 7: Japanese Patent Laid-Open Publication No. 114811/2001
Patent document 8: Japanese Patent Laid-Open Publication No. 40918/2003
Patent document 9: pamphlet of International Publication No. 2006/077945

DISCLOSURE OF THE INVENTION

Problem to be Solved by the Invention

According to the studies by the present inventors, the catalysts of the patent documents 1 to 8 are insufficient in the effect of widening a molecular weight distribution of an olefin polymer, or they are catalysts that widen a molecular weight distribution by increasing a low-molecular weight component. On the other hand, there is estimation in the market that these catalysts cannot be said to be satisfactory in improvement in melt tension of an olefin polymer, and from the viewpoint of cost reduction, development of a catalyst capable of producing an olefin polymer having a wider molecular weight distribution through a simpler process has been desired in the market.

The cyclic ester compound contained in the solid titanium catalyst component described in the patent document 9 is often a compound more expensive than electron donors contained in conventional solid titanium catalyst components. On that account, the solid titanium catalyst component disclosed in the patent document 9 has high production cost though it exhibits high performance in point of widening a molecular weight distribution, and therefore, improvement in production cost has been desired.

Accordingly, it is an object of the present invention to provide a catalyst component and a catalyst which are capable of simply and easily producing an olefin polymer which has a wide molecular weight distribution, high stereoregularity and high melt tension and is suitable for high-speed stretching and high-speed molding, at a cost equivalent to that of conventional polymers.

Means to Solve the Problem

The present inventors have earnestly studied, and as a result, they have found that when a solid titanium catalyst component containing plural kinds of specific cyclic ester compounds having plural carboxylic acid ester groups is used, (1) an olefin polymer having a wide molecular weight distribution can be prepared, and (2) the electron donor exerts an effect as a stereoregularity controlling agent, and an improving effect relating to control of streoregularity can be obtained though such an improving effect is not exerted in the case of using a cyclic ester compound singly. Thus, the present inventors have achieved the present invention. In any of the patent documents 7 and 8, the cyclic ester compound (a) represented by the following formula (1) and having a substituent R is neither described nor suggested.

The solid titanium catalyst component (I) of the present invention comprises titanium, magnesium, halogen, a cyclic ester compound (a) represented by the following formula (1) and a cyclic ester compound (b) represented by the following formula (2).

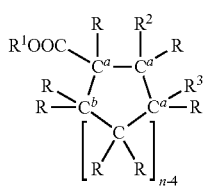
(1)

In the formula (1), n is an integer of 5 to 10.

$R^2$ and $R^3$ are each independently $COOR^1$ or R, and at least one of $R^2$ and $R^3$ is $COOR^1$.

A single bond (except $C^a$—$C^a$ bond, and $C^a$—$C^b$ bond in the case where $R^3$ is R) in the cyclic skeleton may be replaced with a double bond.

$R^1$ is each independently a monovalent hydrocarbon group of 1 to 20 carbon atoms.

Plural R are each independently an atom or a group selected from a hydrogen atom, a hydrocarbon group of 1 to 20 carbon atoms, a halogen atom, a nitrogen-containing group, an oxygen-containing group, a phosphorous-containing group, a halogen-containing group and a silicon-containing group, and they may be bonded to one another to from a ring, but at least one R is not a hydrogen atom.

In a skeleton of the ring formed by bonding of plural R to one another may be contained a double bond, and when two or more $C^a$ to each of which $COOR^1$ is bonded are contained in the skeleton of the ring, the number of carbon atoms to constitute the skeleton of the ring is 5 to 10.

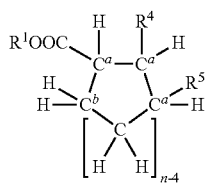
(2)

In the formula (2), n is an integer of 5 to 10.

$R^4$ and $R^5$ are each independently $COOR^1$ or a hydrogen atom, at least one of $R^4$ and $R^5$ is $COOR^1$, $R^1$ is each independently a monovalent hydrocarbon group of 1 to 20 carbon atoms, and a single bond (except $C^a$—$C^a$ bond, and $C^a$—$C^b$ bond in the case where $R^5$ is R) in the cyclic skeleton may be replaced with a double bond.

In the formula (1), all the bonds between carbon atoms in the cyclic skeleton are preferably single bonds.

In the formula (1), n is preferably 6.

The cyclic ester compound (a) is preferably a compound represented by the following formula (1a).

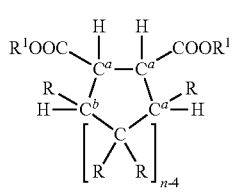
(1a)

In the formula (1a), n is an integer of 5 to 10.

A single bond (except $C^a$—$C^a$ bond and $C^a$—$C^b$ bond) in the cyclic skeleton may be replaced with a double bond.

$R^1$ is each independently a monovalent hydrocarbon group of 1 to 20 carbon atoms.

Plural R are each independently an atom or a group selected from a hydrogen atom, a hydrocarbon group of 1 to 20 carbon atoms, a halogen atom, a nitrogen-containing group, an oxygen-containing group, a phosphorous-containing group, a halogen-containing group and a silicon-containing group, and they may be bonded to one another to from a ring, but at least one R is not a hydrogen atom.

In a skeleton of the ring formed by bonding of plural R to one another may be contained a double bond, and when two or more $C^a$ to each of which $COOR^1$ is bonded are contained in the skeleton of the ring, the number of carbon atoms to constitute the skeleton of the ring is 5 to 10.

In the formula (2), all the bonds between carbon atoms in the cyclic skeleton are preferably single bonds.

In the formula (2), n is preferably 6.

The cyclic ester compound (b) is preferably a compound represented by the following formula (2a).

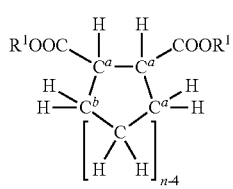
(2a)

In the formula (2a), n is an integer of 5 to 10.

$R^1$ is each independently a monovalent hydrocarbon group of 1 to 20 carbon atoms. A single bond (except $C^a$—$C^a$ bond and $C^a$—$C^b$ bond) in the cyclic skeleton may be replaced with a double bond.

The olefin polymerization catalyst of the present invention comprises:

the above-mentioned solid titanium catalyst component (I), and an organometallic compound catalyst component (II) containing a metallic element selected from the group 1, the group 2 and the group 13 of the periodic table.

The olefin polymerization catalyst of the invention may further comprise an electron donor (III).

The process for preparing an olefin polymer of the present invention comprises polymerizing an olefin in the presence of the above-mentioned olefin polymerization catalyst.

Effect of the Invention

The solid titanium catalyst component, the olefin polymerization catalyst and the process for preparing an olefin polymer according to the invention are suitable for preparing an olefin polymer having a wide molecular weight distribution with high activity.

If the solid titanium catalyst component, the olefin polymerization catalyst and the process for preparing an olefin polymer according to the invention are used, it can be expected that preparation of an olefin polymer excellent not only in molding properties such as high-speed stretchability and high-speed moldability but also in rigidity becomes possible.

The cyclic ester compound (a) is often a compound more expensive than electron donors contained in the conventional solid titanium catalyst components. On the other hand, the cyclic ester compound (b) is often a compound having a price of not more than 1/10 of the price of the cyclic ester compound (a). On that account, the solid titanium catalyst component of the invention capable of keeping the effect of widening a molecular weight distribution with decreasing the content of the cyclic ester compound (a) has an effect of reducing the production cost.

Further, if the solid titanium catalyst component containing plural kinds of specific cyclic ester compounds having plural carboxylic acid ester groups is used, the electron donor (III) exerts an effect as a stereoregularity controlling agent, and an improving effect relating to control of stereoregularity can be obtained though such an effect is not exerted in the case of using a cyclic ester compound singly.

BRIEF DESCRIPTION OF THE DRAWING

FIG. 1 is a graph showing a relationship between a proportion of DMCHIBU added and an Mw/Mn value.

BEST MODE FOR CARRYING OUT THE INVENTION

The solid titanium catalyst component (I), the olefin polymerization catalyst and the process for preparing an olefin polymer according to the invention are described in detail hereinafter.

Solid Titanium Catalyst Component (I)

The solid titanium catalyst component (I) of the invention comprises titanium, magnesium, halogen, a cyclic ester compound (a) and a cyclic ester compound (b).

Cyclic Ester Compound (a)

The cyclic ester compound (a) has plural carboxylic acid ester groups and is represented by the following formula (1).

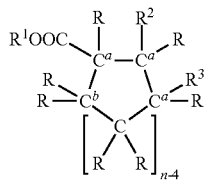

(1)

In the formula (1), n is an integer of 5 to 10, preferably an integer of 5 to 7, particularly preferably 6. $C^a$ and $C^b$ are each a carbon atom.

$R^2$ and $R^3$ are each independently $COOR^1$ or R, and at least one of $R^2$ and $R^3$ is $COOR^1$.

Although all the bonds between carbon atoms in the cyclic skeleton are preferably single bonds, any one of the $C^a$ bond and $C^a$—$C^b$ bond in the case where $R^3$ is R in the cyclic skeleton may be replaced with a double bond.

Plural $R^1$ are each independently a monovalent hydrocarbon group of 1 to 20 carbon atoms, preferably 1 to 10 carbon atoms, more preferably 2 to 8 carbon atoms, still more preferably 4 to 8 carbon atoms, particularly preferably 4 to 6 carbon atoms. Examples of the hydrocarbon groups include ethyl group, n-propyl group, isopropyl group, n-butyl group, isobutyl group, hexyl group, heptyl group, octyl group, 2-ethylhexyl group, decyl group, dodecyl group, tetradecyl group, hexadecyl group, octadecyl group and eicosyl group. Of these, n-butyl group, isobutyl group, hexyl group and octyl group are preferable, and n-butyl group and isobutyl group are particularly preferable, because an olefin polymer having a wide molecular weight distribution is apt to be prepared.

Plural R are each independently an atom or a group selected from a hydrogen atom, a hydrocarbon group of 1 to 20 carbon atoms, a halogen atom, a nitrogen-containing group, an oxygen-containing group, a phosphorous-containing group, a halogen-containing group and a silicon-containing group, but at least one R is not a hydrogen atom.

Of the above groups, a hydrocarbon group of 1 to 20 carbon atoms is preferable as R other than a hydrogen atom. Examples of the hydrocarbon groups of 1 to 20 carbon atoms include aliphatic hydrocarbon groups, alicyclic hydrocarbon groups and aromatic hydrocarbon groups, such as methyl group, ethyl group, n-propyl group, isopropyl group, n-butyl group, isobutyl group, sec-butyl group, n-pentyl group, cyclopentyl group, n-hexyl group, cyclohexyl group, vinyl group, phenyl group and octyl group. Of these, aliphatic hydrocarbon groups are preferable, and specifically, methyl group, ethyl group, n-propyl group, isopropyl group, n-butyl group, isobutyl group and sec-butyl group are preferable.

Plural R may be bonded to one another to form a ring, and in a skeleton of the ring formed by bonding of plural R to one another, a double bond may be contained. When two or more $C^a$ to each of which $COOR^1$ is bonded are contained in the skeleton of the ring, the number of carbon atoms to constitute the skeleton of the ring is 5 to 10.

Examples of the skeletons of the ring include norbornane skeleton and tetracyclododecene skeleton.

Plural R may be carbonyl structure-containing groups, such as carboxylic acid ester group, alkoxy group, siloxy group, aldehyde group and acetyl group, and their substituents preferably contain one or more hydrocarbon groups.

Examples of such cyclic ester compounds (a) include the following compounds which are described in a pamphlet of International Publication No. 2006/077945 (patent document 9):

diethyl 3-methylcyclohexane-1,2-dicarboxylate,
di-n-propyl 3-methylcyclohexane-1,2-dicarboxylate, diisopropyl 3-methylcyclohexane-1,2-dicarboxylate,
di-n-butyl 3-methylcyclohexane-1,2-dicarboxylate,
diisobutyl 3-methylcyclohexane-1,2-dicarboxylate,
dihexyl 3-methylcyclohexane-1,2-dicarboxylate,
diheptyl 3-methylcyclohexane-1,2-dicarboxylate,
dioctyl 3-methylcyclohexane-1,2-dicarboxylate,
di-2-ethylhexyl 3-methylcyclohexane-1,2-dicarboxylate,
didecyl 3-methylcyclohexane-1,2-dicarboxylate,
diethyl 4-methylcyclohexane-1,3-dicarboxylate,
diisobutyl 4-methylcyclohexane-1,3-dicarboxylate,
diethyl 4-methylcyclohexane-1,2-dicarboxylate,
di-n-propyl 4-methylcyclohexane-1,2-dicarboxylate,
diisopropyl 4-methylcyclohexane-1,2-dicarboxylate,
di-n-butyl 4-methylcyclohexane-1,2-dicarboxylate,
diisobutyl 4-methylcyclohexane-1,2-dicarboxylate,
dihexyl 4-methylcyclohexane-1,2-dicarboxylate,
diheptyl 4-methylcyclohexane-1,2-dicarboxylate,
dioctyl 4-methylcyclohexane-1,2-dicarboxylate,
di-2-ethylhexyl 4-methylcyclohexane-1,2-dicarboxylate,
didecyl 4-methylcyclohexane-1,2-dicarboxylate,
diethyl 5-methylcyclohexane-1,3-dicarboxylate,
diisobutyl 5-methylcyclohexane-1,3-dicarboxylate,
diethyl 3,4-dimethylcyclohexane-1,2-dicarboxylate,
di-n-propyl 3,4-dimethylcyclohexane-1,2-dicarboxylate,
diisopropyl 3,4-dimethylcyclohexane-1,2-dicarboxylate,
di-n-butyl 3,4-dimethylcyclohexane-1,2-dicarboxylate,
diisobutyl 3,4-dimethylcyclohexane-1,2-dicarboxylate,
dihexyl 3,4-dimethylcyclohexane-1,2-dicarboxylate,
diheptyl 3,4-dimethylcyclohexane-1,2-dicarboxylate,
dioctyl 3,4-dimethylcyclohexane-1,2-dicarboxylate,
di-2-ethylhexyl 3,4-dimethylcyclohexane-1,2-dicarboxylate,
didecyl 3,4-dimethylcyclohexane-1,2-dicarboxylate,
diethyl 3,6-dimethylcyclohexane-1,2-dicarboxylate,
di-n-propyl 3,6-dimethylcyclohexane-1,2-dicarboxylate,
diisopropyl 3,6-dimethylcyclohexane-1,2-dicarboxylate,
di-n-butyl 3,6-dimethylcyclohexane-1,2-dicarboxylate,
diisobutyl 3,6-dimethylcyclohexane-1,2-dicarboxylate,
dihexyl 3,6-dimethylcyclohexane-1,2-dicarboxylate,
diheptyl 3,6-dimethylcyclohexane-1,2-dicarboxylate,
dioctyl 3,6-dimethylcyclohexane-1,2-dicarboxylate,
di-2-ethylhexyl 3,6-dimethylcyclohexane-1,2-dicarboxylate,
didecyl 3,6-dimethylcyclohexane-1,2-dicarboxylate,
diethyl 3,6-diphenylcyclohexane-1,2-dicarboxylate,
di-n-propyl 3,6-diphenylcyclohexane-1,2-dicarboxylate,
diisopropyl 3,6-diphenylcyclohexane-1,2-dicarboxylate,
di-n-butyl 3,6-diphenylcyclohexane-1,2-dicarboxylate,
diisobutyl 3,6-diphenylcyclohexane-1,2-dicarboxylate,
dihexyl 3,6-diphenylcyclohexane-1,2-dicarboxylate,
dioctyl 3,6-diphenylcyclohexane-1,2-dicarboxylate,
didecyl 3,6-diphenylcyclohexane-1,2-dicarboxylate,
diethyl 3-methyl-6-ethylcyclohexane-1,2-dicarboxylate,
di-n-propyl 3-methyl-6-ethylcyclohexane-1,2-dicarboxylate,
diisopropyl 3-methyl-6-ethylcyclohexane-1,2-dicarboxylate,
di-n-butyl 3-methyl-6-ethylcyclohexane-1,2-dicarboxylate,
diisobutyl 3-methyl-6-ethylcyclohexane-1,2-dicarboxylate,
dihexyl 3-methyl-6-ethylcyclohexane-1,2-dicarboxylate,
diheptyl 3-methyl-6-ethylcyclohexane-1,2-dicarboxylate,
dioctyl 3-methyl-6-ethylcyclohexane-1,2-dicarboxylate,
di-2-ethylhexyl 3-methyl-6-ethylcyclohexane-1,2-dicarboxylate,
didecyl 3-methyl-6-ethylcyclohexane-1,2-dicarboxylate,
diethyl 3-methyl-6-n-propylcyclohexane-1,2-dicarboxylate,
di-n-propyl 3-methyl-6-n-propylcyclohexane-1,2-dicarboxylate,
diisopropyl 3-methyl-6-n-propylcyclohexane-1,2-dicarboxylate,
di-n-butyl 3-methyl-6-n-propylcyclohexane-1,2-dicarboxylate,
diisobutyl 3-methyl-6-n-propylcyclohexane-1,2-dicarboxylate,
dihexyl 3-methyl-6-n-propylcyclohexane-1,2-dicarboxylate,
diheptyl 3-methyl-6-n-propylcyclohexane-1,2-dicarboxylate,
dioctyl 3-methyl-6-n-propylcyclohexane-1,2-dicarboxylate,
di-2-ethylhexyl 3-methyl-6-n-propylcyclohexane-1,2-dicarboxylate,
didecyl 3-methyl-6-n-propylcyclohexane-1,2-dicarboxylate,
diethyl 3-hexylcyclohexane-1,2-dicarboxylate,
diisobutyl 3-hexylcyclohexane-1,2-dicarboxylate,
diethyl 3,6-dihexylcyclohexane-1,2-dicarboxylate,
diisobutyl 3-hexyl-6-pentylcyclohexane-1,2-dicarboxylate,
diethyl 3-methylcyclopentane-1,2-dicarboxylate,
diisobutyl 3-methylcyclopentane-1,2-dicarboxylate,
diheptyl 3-methylcyclopentane-1,2-dicarboxylate,
didecyl 3-methylcyclopentane-1,2-dicarboxylate,
diethyl 4-methylcyclopentane-1,3-dicarboxylate,
diisobutyl 4-methylcyclopentane-1,3-dicarboxylate,
diethyl 4-methylcyclopentane-1,2-dicarboxylate,
diisobutyl 4-methylcyclopentane-1,2-dicarboxylate,
diheptyl 4-methylcyclopentane-1,2-dicarboxylate,
didecyl 4-methylcyclopentane-1,2-dicarboxylate,
diethyl 5-methylcyclopentane-1,3-dicarboxylate,
diisobutyl 5-methylcyclopentane-1,3-dicarboxylate,
diethyl 3,4-dimethylcyclopentane-1,2-dicarboxylate,
diisobutyl 3,4-dimethylcyclopentane-1,2-dicarboxylate,
diheptyl 3,4-dimethylcyclopentane-1,2-dicarboxylate,
didecyl 3,4-dimethylcyclopentane-1,2-dicarboxylate,
diethyl 3,5-dimethylcyclopentane-1,2-dicarboxylate,
diisobutyl 3,5-dimethylcyclopentane-1,2-dicarboxylate,
diheptyl 3,5-dimethylcyclopentane-1,2-dicarboxylate,
didecyl 3,5-dimethylcyclopentane-1,2-dicarboxylate,
diethyl 3-hexylcyclopentane-1,2-dicarboxylate,
diethyl 3,5-dihexylcyclopentane-1,2-dicarboxylate,
diisobutyl 3-hexyl-5-pentylcyclopentane-1,2-dicarboxylate,
diethyl 3-methyl-5-n-propylcyclopentane-1,2-dicarboxylate,
di-n-propyl 3-methyl-5-n-propylcyclopentane-1,2-dicarboxylate,
diisopropyl 3-methyl-5-n-propylcyclopentane-1,2-dicarboxylate,
di-n-butyl 3-methyl-5-n-propylcyclopentane-1,2-dicarboxylate,
diisobutyl 3-methyl-5-n-propylcyclopentane-1,2-dicarboxylate,
dihexyl 3-methyl-5-n-propylcyclopentane-1,2-dicarboxylate,
dioctyl 3-methyl-5-n-propylcyclopentane-1,2-dicarboxylate,
didecyl 3-methyl-5-n-propylcyclopentane-1,2-dicarboxylate,
diethyl 3-methylcycloheptane-1,2-dicarboxylate,
diisobutyl 3-methylcycloheptane-1,2-dicarboxylate,
diheptyl 3-methylcycloheptane-1,2-dicarboxylate,
didecyl 3-methylcycloheptane-1,2-dicarboxylate,
diethyl 4-methylcycloheptane-1,3-dicarboxylate,
diisobutyl 4-methylcycloheptane-1,3-dicarboxylate,
diethyl 4-methylcycloheptane-1,2-dicarboxylate,
diisobutyl 4-methylcycloheptane-1,2-dicarboxylate,
diheptyl 4-methylcycloheptane-1,2-dicarboxylate,
didecyl 4-methylcycloheptane-1,2-dicarboxylate,
diethyl 5-methylcycloheptane-1,3-dicarboxylate, diisobutyl 5-methylcycloheptane-1,3-dicarboxylate,
diethyl 3,4-dimethylcycloheptane-1,2-dicarboxylate,
diisobutyl 3,4-dimethylcycloheptane-1,2-dicarboxylate,
diheptyl 3,4-dimethylcycloheptane-1,2-dicarboxylate,
didecyl 3,4-dimethylcycloheptane-1,2-dicarboxylate,
diethyl 3,7-dimethylcycloheptane-1,2-dicarboxylate,
diisobutyl 3,7-dimethylcycloheptane-1,2-dicarboxylate,
diheptyl 3,7-dimethylcycloheptane-1,2-dicarboxylate,
didecyl 3,7-dimethylcycloheptane-1,2-dicarboxylate,
diethyl 3-hexylcycloheptane-1,2-dicarboxylate,
diethyl 3,7-dihexylcycloheptane-1,2-dicarboxylate,
diisobutyl 3-hexyl-7-pentylcycloheptane-1,2-dicarboxylate,
diethyl 3-methyl-7-n-propylcycloheptane-1,2-dicarboxylate,
di-n-propyl 3-methyl-7-n-propylcycloheptane-1,2-dicarboxylate,
diisopropyl 3-methyl-7-n-propylcycloheptane-1,2-dicarboxylate,
di-n-butyl 3-methyl-7-n-propylcycloheptane-1,2-dicarboxylate,
diisobutyl 3-methyl-7-n-propylcycloheptane-1,2-dicarboxylate,
dihexyl 3-methyl-7-n-propylcycloheptane-1,2-dicarboxylate,
dioctyl 3-methyl-7-n-propylcycloheptane-1,2-dicarboxylate,
didecyl 3-methyl-7-n-propylcycloheptane-1,2-dicarboxylate,
diethyl 3-methylcyclooctane-1,2-dicarboxylate,
diethyl 3-methylcyclodecane-1,2-dicarboxylate,
diisobutyl 3-vinylcyclohexane-1,2-dicarboxylate,
diisobutyl 3,6-diphenylcyclohexane-1,2-dicarboxylate,
diethyl 3,6-dicyclohexylcyclohexane-1,2-dicarboxylate,
diisobutyl norbornane-2,3-dicarboxylate,
diisobutyl tetracyclododecane-2,3-dicarboxylate,
diethyl 3,6-dimethyl-4-cyclohexene-1,2-dicarboxylate,
di-n-propyl 3,6-dimethyl-4-cyclohexene-1,2-dicarboxylate,
diisopropyl 3,6-dimethyl-4-cyclohexene-1,2-dicarboxylate,
di-n-butyl 3,6-dimethyl-4-cyclohexene-1,2-dicarboxylate,
diisobutyl 3,6-dimethyl-4-cyclohexene-1,2-dicarboxylate,
dihexyl 3,6-dimethyl-4-cyclohexene-1,2-dicarboxylate,
diheptyl 3,6-dimethyl-4-cyclohexene-1,2-dicarboxylate,
dioctyl 3,6-dimethyl-4-cyclohexene-1,2-dicarboxylate,
di-2-ethylhexyl 3,6-dimethyl-4-cyclohexene-1,2-dicarboxylate,
didecyl 3,6-dimethyl-4-cyclohexene-1,2-dicarboxylate,
diethyl 3,6-dihexyl-4-cyclohexene-1,2-dicarboxylate, and
diisobutyl 3-hexyl-6-pentyl-4-cyclohexene-1,2-dicarboxylate.

Further, dicarboxylic acid esters of cyclic diol compounds corresponding to the above compounds can be also mentioned as preferred compounds. Preferred examples of such compounds include:
3,6-dimethylcyclohexyl-1,2-diacetate,
3,6-dimethylcyclohexyl-1,2-dibutanate,
3-methyl-6-propylcyclohexyl-1,2-diolacetate,
3-methyl-6-propylcyclohexyl-1,2-butanate,
3,6-dimethylcyclohexyl-1,2-dibenzoate,
3,6-dimethylcyclohexyl-1,2-ditoluate,
3-methyl-6-propylcyclohexyl-1,2-dibenzoate, and
3-methyl-6-propylcyclohexyl-1,2-ditoluate.

In such compounds having diester structure as above, isomers such as cis form and trans form derived from plural COOR$^1$ groups in the formula (1) are present, and any structure has an effect which is in accord with the object of the invention. However, a compound having a higher content of trans form is preferable. In the case of a compound having a higher content of trans form, not only an effect of widening a molecular weight distribution but also activity and stereoregularity of the resulting polymer tend to become higher.

As the cyclic ester compounds (a), compounds represented by the following formulas (1-1) to (1-6) are preferable.

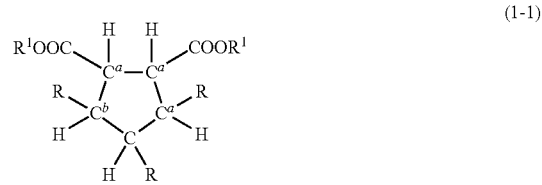

(1-1)

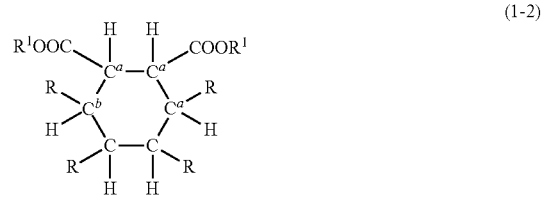

(1-2)

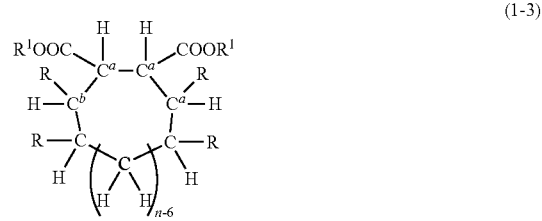

(1-3)

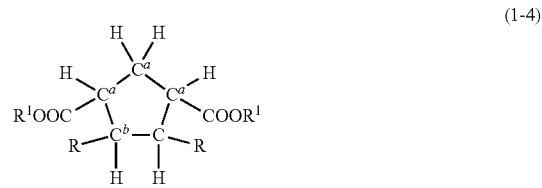

(1-4)

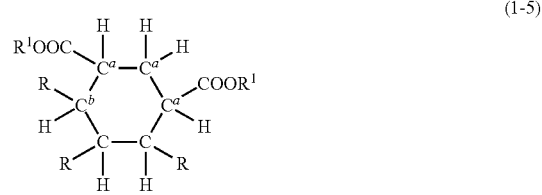

(1-5)

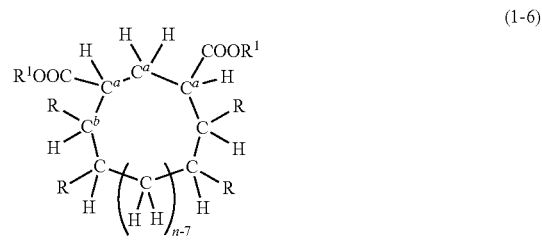

(1-6)

In the formulas (1-1) to (1-6), $R^1$ and R are the same as those previously described.

In the formulas (1-1) to (1-3), a single bond (except $C^a$—$C^a$ bond and $C^a$—$C^b$ bond) in the cyclic skeleton may be replaced with a double bond.

In the formulas (1-4) to (1-6), a single bond (except $C^a$—$C^a$ bond) in the cyclic skeleton may be replaced with a double bond.

In the formulas (1-3) and (1-6), n is an integer of 7 to 10.

As the cyclic ester compound (a), a compound represented by the following formula (1a) is particularly preferable.

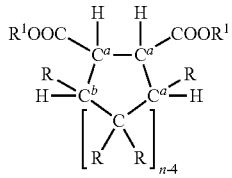

(1a)

In the formula (1a), n, $R^1$ and R are the same as those previously described (that is, they have the same meanings as those in the formula (1)), and a single bond (except $C^a$—$C^a$ bond and $C^a$—$C^b$ bond) in the cyclic skeleton may be replaced with a double bond.

Examples of the compounds represented by the above formula (1a) include:
diisobutyl 3,6-dimethylcyclohexane-1,2-dicarboxylate,
di-n-hexyl 3,6-dimethylcyclohexane-1,2-dicarboxylate,
di-n-octyl 3,6-dimethylcyclohexane-1,2-dicarboxylate,
diisobutyl 3-methyl-6-ethylcyclohexane-1,2-dicarboxylate,
di-n-hexyl 3-methyl-6-ethylcyclohexane-1,2-dicarboxylate,
di-n-octyl 3-methyl-6-ethylcyclohexane-1,2-dicarboxylate,
diisobutyl 3-methyl-6-n-propylcyclohexane-1,2-dicarboxylate,
di-n-hexyl 3-methyl-6-n-propylcyclohexane-1,2-dicarboxylate,
di-n-octyl 3-methyl-6-n-propylcyclohexane-1,2-dicarboxylate,
diisobutyl 3,6-diethylcyclohexane-1,2-dicarboxylate,
di-n-hexyl 3,6-diethylcyclohexane-1,2-dicarboxylate,
di-n-octyl 3,6-diethylcyclohexane-1,2-dicarboxylate,
diisobutyl 3,5-dimethylcyclopentane-1,2-dicarboxylate,
di-n-hexyl 3,5-dimethylcyclopentane-1,2-dicarboxylate,
di-n-octyl 3,5-dimethylcyclopentane-1,2-dicarboxylate,
diisobutyl 3-methyl-5-ethylcyclopentane-1,2-dicarboxylate,
di-n-hexyl 3-methyl-5-ethylcyclopentane-1,2-dicarboxylate,
di-n-octyl 3-methyl-5-ethylcyclopentane-1,2-dicarboxylate,
di-n-hexyl 3-methyl-5-n-propylcyclopentane-1,2-dicarboxylate,
di-n-octyl 3-methyl-5-n-propylcyclopentane-1,2-dicarboxylate,
diisobutyl 3,5-diethylcyclopentane-1,2-dicarboxylate,
di-n-hexyl 3,5-diethylcyclopentane-1,2-dicarboxylate,
di-n-octyl 3,5-diethylcyclopentane-1,2-dicarboxylate,
diisobutyl 3,7-dimethylcycloheptane-1,2-dicarboxylate,
di-n-hexyl 3,7-dimethylcycloheptane-1,2-dicarboxylate,
di-n-octyl 3,7-dimethylcycloheptane-1,2-dicarboxylate,
diisobutyl 3-methyl-7-ethylcycloheptane-1,2-dicarboxylate,
di-n-hexyl 3-methyl-7-ethylcycloheptane-1,2-dicarboxylate,
di-n-octyl 3-methyl-7-ethylcycloheptane-1,2-dicarboxylate,
di-n-hexyl 3-methyl-7-n-propylcycloheptane-1,2-dicarboxylate,
di-n-octyl 3-methyl-7-n-propylcycloheptane-1,2-dicarboxylate,
diisobutyl 3,7-diethylcycloheptane-1,2-dicarboxylate,
di-n-hexyl 3,7-diethylcycloheptane-1,2-dicarboxylate, and
di-n-octyl 3,7-diethylcycloheptane-1,2-dicarboxylate.

Of the above compounds, more preferable are:
diisobutyl 3,6-dimethylcyclohexane-1,2-dicarboxylate,
di-n-hexyl 3,6-dimethylcyclohexane-1,2-dicarboxylate,
di-n-octyl 3,6-dimethylcyclohexane-1,2-dicarboxylate,
diisobutyl 3-methyl-6-ethylcyclohexane-1,2-dicarboxylate,
di-n-hexyl 3-methyl-6-ethylcyclohexane-1,2-dicarboxylate,
di-n-octyl 3-methyl-6-ethylcyclohexane-1,2-dicarboxylate,
diisobutyl 3-methyl-6-n-propylcyclohexane-1,2-dicarboxylate,
di-n-hexyl 3-methyl-6-n-propylcyclohexane-1,2-dicarboxylate,
di-n-octyl 3-methyl-6-n-propylcyclohexane-1,2-dicarboxylate,
diisobutyl 3,6-diethylcyclohexane-1,2-dicarboxylate,
di-n-hexyl 3,6-diethylcyclohexane-1,2-dicarboxylate, and
di-n-octyl 3,6-diethylcyclohexane-1,2-dicarboxylate.

Although these compounds can be produced by the use of Diels-Alder reaction, polyene compounds as raw materials are relatively expensive, and therefore, the production cost of the above compounds tends to become a little higher than that of the conventional electron donor compounds.

In such cyclic ester compounds (a) having diester structure as above, isomers such as cis form and trans form are present, and any structure has an effect which is in accord with the object of the invention. However, a compound having a higher content of trans form is preferable. In the case of a compound having a higher content of trans form, not only an effect of widening a molecular weight distribution but also activity and stereoregularity of the resulting polymer tend to become higher. The proportion of the trans form in the total of the cis form and the trans form is preferably not less than 51%. The lower limit is more preferably 55%, still more preferably 60%, particularly preferably 65%. On the other hand, the upper limit is preferably 100%, more preferably 90%, still more preferably 85%, particularly preferably 79%.

Cyclic Ester Compound (b)

The cyclic ester compound (b) has plural carboxylic acid ester groups and is represented by the following formula (2).

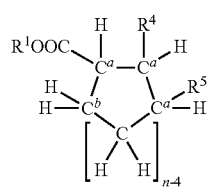

(2)

In the formula (2), n is an integer of 5 to 10, preferably an integer of 5 to 7, particularly preferably 6. $C^a$ and $C^b$ are each a carbon atom.

Although all the bonds between carbon atoms in the cyclic skeleton are preferably single bonds, any one of the single bonds other than $C^a$—$C^a$ bond and $C^a$—$C^b$ bond in the case where $R^5$ is a hydrogen atom in the cyclic skeleton may be replaced with a double bond.

$R^4$ and $R^5$ are each independently $COOR^1$ or a hydrogen atom, at least one of $R^4$ and $R^5$ is $COOR^1$, and $R^1$ is each independently a monovalent hydrocarbon group of 1 to 20 carbon atoms.

Plural $R^1$ are each independently a monovalent hydrocarbon group of 1 to 20 carbon atoms, preferably 1 to 10 carbon atoms, more preferably 2 to 8 carbon atoms, still more preferably 4 to 8 carbon atoms, particularly preferably 4 to 6 carbon atoms. Examples of the hydrocarbon groups include ethyl group, n-propyl group, isopropyl group, n-butyl group, isobutyl group, hexyl group, heptyl group, octyl group, 2-ethylhexyl group, decyl group, dodecyl group, tetradecyl group, hexadecyl group, octadecyl group and eicosyl group. Of these, n-butyl group, isobutyl group, hexyl group and octyl group are preferable, and n-butyl group and isobutyl group are particularly preferable, because an olefin polymer having a wide molecular weight distribution is apt to be prepared.

Examples of such cyclic ester compounds (b) include:
diethyl cyclohexane-1,2-dicarboxylate,
di-n-propyl cyclohexane-1,2-dicarboxylate,
diisopropyl cyclohexane-1,2-dicarboxylate,
di-n-butyl cyclohexane-1,2-dicarboxylate,
diisobutyl cyclohexane-1,2-dicarboxylate,
dihexyl cyclohexane-1,2-dicarboxylate,
diheptyl cyclohexane-1,2-dicarboxylate,
dioctyl cyclohexane-1,2-dicarboxylate,
di-2-ethylhexyl cyclohexane-1,2-dicarboxylate,
didecyl cyclohexane-1,2-dicarboxylate,
diethyl cyclohexane-1,3-dicarboxylate,
diisobutyl cyclohexane-1,3-dicarboxylate,
diethyl cyclopentane-1,2-dicarboxylate,
diisopropyl cyclopentane-1,2-dicarboxylate,
diisobutyl cyclopentane-1,2-dicarboxylate,
diheptyl cyclopentane-1,2-dicarboxylate,
didecyl cyclopentane-1,2-dicarboxylate,
diethyl cyclopentane-1,3-dicarboxylate,
diisobutyl cyclopentane-1,3-dicarboxylate,
diethyl cycloheptane-1,2-dicarboxylate,
diisopropyl cycloheptane-1,2-dicarboxylate,
diisobutyl cycloheptane-1,2-dicarboxylate,
diheptyl cycloheptane-1,2-dicarboxylate,
didecyl cycloheptane-1,2-dicarboxylate,
diethyl cycloheptane-1,3-dicarboxylate,
diisobutyl cycloheptane-1,3-dicarboxylate,
diethyl cyclooctane-1,2-dicarboxylate,
diethyl cyclodecane-1,2-dicarboxylate,
diethyl 4-cyclohexene-1,2-dicarboxylate,
di-n-propyl 4-cyclohexene-1,2-dicarboxylate,
diisopropyl 4-cyclohexene-1,2-dicarboxylate,
di-n-butyl 4-cyclohexene-1,2-dicarboxylate,
diisobutyl 4-cyclohexene-1,2-dicarboxylate,
dihexyl 4-cyclohexene-1,2-dicarboxylate,
diheptyl 4-cyclohexene-1,2-dicarboxylate,
dioctyl 4-cyclohexene-1,2-dicarboxylate,
didecyl 4-cyclohexene-1,2-dicarboxylate,
diethyl 4-cyclohexene-1,3-dicarboxylate,
diisobutyl 4-cyclohexene-1,3-dicarboxylate,
diethyl 3-cyclopentene-1,2-dicarboxylate,
diisopropyl 3-cyclopentene-1,2-dicarboxylate,
diisobutyl 3-cyclopentene-1,2-dicarboxylate,
diheptyl 3-cyclopentene-1,2-dicarboxylate,
didecyl 3-cyclopentene-1,2-dicarboxylate,
diethyl 3-cyclopentene-1,3-dicarboxylate,
diisobutyl 3-cyclopentene-1,3-dicarboxylate,
diethyl 4-cycloheptene-1,2-dicarboxylate,
diisopropyl 4-cycloheptene-1,2-dicarboxylate,
diisobutyl 4-cycloheptene-1,2-dicarboxylate,
diheptyl 4-cycloheptene-1,2-dicarboxylate,
didecyl 4-cycloheptene-1,2-dicarboxylate,
diethyl 4-cycloheptene-1,3-dicarboxylate,
diisobutyl 4-cycloheptene-1,3-dicarboxylate,
diethyl 5-cyclooctene-1,2-dicarboxylate, and
diethyl 6-cyclodecene-1,2-dicarboxylate.

Further, dicarboxylic acid esters of cyclic diol compounds corresponding to the above compounds can be also mentioned as preferred compounds. Examples of such compounds include:
cyclohexyl-1,2-diacetate,
cyclohexyl-1,2-dibutanate,
cyclohexyl-1,2-dibenzoate, and
cyclohexyl-1,2-ditoluate.

In such compounds having diester structure as above, isomers such as cis form and trans form are present, and any structure has an effect which is in accord with the object of the invention.

The proportion of the trans form in the total of the cis form and the trans form is preferably not less than 51%. The lower limit is more preferably 55%, still more preferably 60%, particularly preferably 65%. On the other hand, the upper limit is preferably 100%, more preferably 90%, still more preferably 85%, particularly preferably 79%. Although the reason is not clear, it is presumed that variations of the later-described stereoisomers are within the region suitable for widening the molecular weight distribution.

In particular, the cyclohexane-1,2-dicarboxylic acid diester wherein n in the formula (2) is 6 has a trans purity of the above range.

If the trans purity is less than 51%, the effect of widening molecular weight distribution, activity, stereospecificity, etc. sometimes become insufficient. If the trans purity exceeds 79%, the effect of widening molecular weight distribution sometimes becomes insufficient. That is to say, when the trans purity is in the above range, there are many advantages in making the effect of widening molecular weight distribution of the resulting polymer and the activity of catalyst or the high stereoregularity of the resulting polymer compatible with each other to a high level.

As the cyclic ester compounds (b), compounds having cycloalkane-1,2-dicarboxylic acid diester structure and represented by the following formula (2a) are preferable, and particularly preferable are:
di-n-butyl cyclohexane-1,2-dicarboxylate,
diisobutyl cyclohexane-1,2-dicarboxylate,
dihexyl cyclohexane-1,2-dicarboxylate,
diheptyl cyclohexane-1,2-dicarboxylate,
dioctyl cyclohexane-1,2-dicarboxylate,
di-2-ethylhexyl cyclohexane-1,2-dicarboxylate,
diisobutyl cyclopentane-1,2-dicarboxylate,
diheptyl cyclopentane-1,2-dicarboxylate,
diisobutyl cycloheptane-1,2-dicarboxylate,
diheptyl cycloheptane-1,2-dicarboxylate, etc.

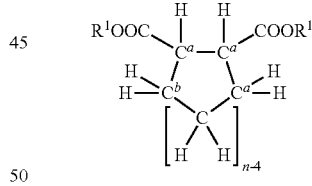

(2a)

In the formula (2a), $R^1$ is the same as that previously described (that is, it has the same meaning as that in the formula (2)), and a single bond (except $C^a$—$C^a$ bond and $C^a$—$C^b$ bond) in the cyclic skeleton may be replaced with a double bond.

Of the above compounds, more preferable are:
diisobutyl cyclohexane-1,2-dicarboxylate,
dihexyl cyclohexane-1,2-dicarboxylate,
diheptyl cyclohexane-1,2-dicarboxylate,
dioctyl cyclohexane-1,2-dicarboxylate, and
di-2-ethylhexyl cyclohexane-1,2-dicarboxylate.

The reason is that not only the catalytic performance is excellent but also these compounds can be prepared relatively inexpensively by utilizing the Diels-Alder reaction.

These compounds may be used singly, or may be used in combination of two or more kinds. Further, the cyclic ester compounds (a) and (b) may be used in combination with the later-described catalyst component (c), within limits not detrimental to the object of the present invention.

The combining molar ratio of the cyclic ester compound (a) to the cyclic ester compound (b) (cyclic ester compound (a)/(cyclic ester compound (a)+cyclic ester compound (b))× 100 (% by mol)) is preferably not less than 10% by mol. The combining molar ratio is more preferably not less than 30% by mol, still more preferably not less than 40% by mol, particularly preferably not less than 50% by mol. The upper limit is preferably 99% by mol, more preferably 90% by mol, still more preferably 85% by mol, particularly preferably 80% by mol.

The cyclic ester compounds (a) and (b) may be formed during the course of preparation of the solid titanium catalyst component (I). For example, by providing a step of substantially bringing carboxylic anhydrides or carboxylic dihalides corresponding to the cyclic ester compounds (a) and (b) into contact with the corresponding alcohols, the cyclic ester compounds (a) and (b) can be incorporated in the solid titanium catalyst component.

By the process for preparing an olefin polymer of the invention, a polymer having a wide molecular weight distribution is obtained. Although the reason is not clear, such a cause as described below is presumed.

The cyclic hydrocarbon structure is known to form various stereostructures such as chair form and boat foam. Moreover, if the cyclic structure has a substituent, the variation of stereostructure which can be taken is further increased. Furthermore, if the bond between a carbon atom to which the ester group (COOR$^1$ group) is bonded and another carbon atom to which the ester group (COOR$^1$ group) is bonded is a single bond, said carbon atoms being among the carbon atoms to constitute the cyclic skeleton of the cyclic ester compound, the variation of stereostructure which can be taken is widened. Such various stereostructures which can be taken lead to formation of various active sites on the solid titanium catalyst component (I). As a result, when olefin polymerization is carried out using the solid titanium catalyst component (I), olefin polymers having various molecular weights can be prepared at once. That is to say, an olefin polymer having a wide molecular weight distribution can be prepared.

Under the conditions of the combining molar ratio of the cyclic ester compound (a) in a wide range, that is, even if the content of the cyclic ester compound (a) in the solid titanium catalyst component is low, the solid titanium catalyst component (I) of the invention can give an olefin polymer having an extremely wide molecular weight distribution. Although the reason of this effect is not clear, the present inventors have presumed as follows.

It is obvious that owing to the presence of the substituent R, the cyclic ester compound (a) has an extremely larger number of variations of stereostructures which can be formed, as compared with the cyclic ester compound (b). On this account, it is thought that the influence of the cyclic ester compound (a) on the molecular weight distribution becomes dominant, and even if the combining molar ratio is low, the cyclic ester compound (a) can give an olefin polymer having an extremely wide molecular weight distribution.

On the other hand, the cyclic ester compound (a) and the cyclic ester compound (b) are relatively analogous in structure, and therefore, these compounds hardly have influence on each other with regard to their basic properties such as activity and stereoregularity. (If compounds of different structures are used, activity, stereoregularity or the like often changes violently, or the effect of one compound often becomes dominant.)

On this account, even if the content of the cyclic ester compound (a) is low, the solid titanium catalyst component (I) of the invention can give an olefin polymer having an extremely wide molecular weight distribution and high streoregularity with high activity.

In the preparation of the solid titanium catalyst component (I) of the invention, a magnesium compound and a titanium compound are used in addition to the above cyclic ester compounds (a) and (b).

Magnesium Compound

Examples of the magnesium compounds include publicly known magnesium compounds, specifically, magnesium halides, such as magnesium chloride and magnesium bromide;

magnesium alkoxyhalides, such as magnesium methoxychloride, magnesium ethoxychloride and magnesium phenoxychloride;

alkoxymagnesiums, such as ethoxymagnesium, isopropoxymagnesium, butoxymagnesium and 2-ethylhexoxymagnesium:

aryloxymagnesiums, such as phenoxymagnesium; and carboxylic acid salts of magnesium, such as magnesium stearate.

These magnesium compounds may be used singly, or may be used in combination of two or more kinds. Further, these magnesium compounds may be complex compounds or double compounds with other metals, or mixtures with other metallic compounds.

Of the above compounds, magnesium compounds containing halogen are preferable, and magnesium halides, particularly magnesium chloride, are preferably employed. Alkoxymagnesiums such as ethoxymagnesium are also preferably employed. The magnesium compound may be that derived from other substance, e.g., a magnesium compound obtained by bringing an organomagnesium compound such as Grignard reagent into contact with titanium halide, silicon halide, halogenated alcohol or the like.

Titanium Compound

The titanium compound is, for example, a tetravalent titanium compound represented by the formula:

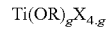

$$Ti(OR)_gX_{4-g}$$

wherein R is a hydrocarbon group, X is a halogen atom, and g is a number of $0 \leq g \leq 4$.

More specifically, there can be mentioned:

titanium tetrahalides, such as $TiCl_4$ and $TiBr_4$;

alkoxytitanium trihalides, such as $Ti(OCH_3)Cl_3$, $Ti(OC_2H_5)Cl_3$, $Ti(O-n-C_4H_9)Cl_3$, $Ti(OC_2H_5)Br_3$ and $Ti(O-isoC_4H_9)Br_3$;

alkoxytitanium dihalides, such as $Ti(OCH_3)_2Cl_2$ and $Ti(OC_2H_5)_2Cl_2$;

alkoxytitanium monohalides, such as $Ti(OCH_3)_3Cl$, $Ti(O-n-C_4H_9)_3Cl$ and $Ti(OC_2H_5)_3Br$; and tetraalkoxytitaniums, such as $Ti(OCH_3)_4$, $Ti(OC_2H_5)_4$, $Ti(OC_4H_9)_4$ and $Ti(O-2-ethylhexyl)_4$.

Of these, preferable are titanium tetrahalides, and particularly preferable is titanium tetrachloride. These titanium compounds may be used singly, or may be used in combination of two or more kinds.

As such magnesium compounds and titanium compounds as above, compounds described in, for example, the patent document 1 and the patent document 2 in detail are also employable.

For preparing the solid titanium catalyst component (I) of the invention, publicly known processes can be used without any restriction, except that the cyclic ester compounds (a) and (b) are used. Preferred examples of the processes include the following processes (P-1) to (P-4).

(P-1) A process wherein a solid adduct consisting of a magnesium compound and a catalyst component (c), the cyclic ester compounds (a) and (b), and a titanium compound in a liquid state are brought into contact with one another in a suspension state in the presence of an inert hydrocarbon solvent.

(P-2) A process wherein a solid adduct consisting of a magnesium compound and a catalyst component (c), the cyclic ester compounds (a) and (b), and a titanium compound in a liquid state are brought into contact with one another plural times.

(P-3) A process wherein a solid adduct consisting of a magnesium compound and a catalyst component (c), the cyclic ester compounds (a) and (b), and a titanium compound in a liquid state are brought into contact with one another plural times in a suspension state in the presence of an inert hydrocarbon solvent.

(P-4) A process wherein a magnesium compound in a liquid state consisting of a magnesium compound and a catalyst component (c), a titanium compound in a liquid state, and the cyclic ester compounds (a) and (b) are brought into contact with one another.

The reaction temperature in the preparation of the solid titanium catalyst component (I) is in the range of preferably −30° C. to 150° C., more preferably −25° C. to 130° C., still more preferably −25° C. to 120° C.

The preparation of the solid titanium catalyst component can be carried out in the presence of a publicly known medium, when necessary. Examples of the media include aromatic hydrocarbons having slight polarity, such as toluene, and publicly known aliphatic hydrocarbons and alicyclic hydrocarbons, such as heptane, octane, decane and cyclohexane. Of these, aliphatic hydrocarbons are preferable.

When olefin polymerization reaction is carried out using the solid titanium catalyst component (1) prepared under the conditions of the above range, the effect of obtaining a polymer having a high molecular weight distribution and the activity of catalyst or the high stereoregularity of the resulting polymer can be made compatible with each other to a high level.

Catalyst Component (c)

As the catalyst component (c) used for forming the solid adduct or the magnesium compound in a liquid state, a publicly known compound capable of solubilizing the aforesaid magnesium compound in the temperature range of about room temperature to 300° C. is preferable, and for example, alcohol, aldehyde, amine, carboxylic acid and mixtures thereof are preferable. As such compounds, compounds described in, for example, the patent document 1 and the patent document 2 in detail are also employable.

Examples of the alcohols having ability to solubilize the magnesium compound include:

aliphatic alcohols, such as methanol, ethanol, propanol, butanol, isobutanol, ethylene glycol, 2-methylpentanol, 2-ethylbutanol, n-heptanol, n-octanol, 2-ethylhexanol, decanol and dodecanol;

alicyclic alcohols, such as cyclohexanol and methylcyclohexanol;

aromatic alcohols, such as benzyl alcohol and methylbenzyl alcohol; and aliphatic alcohols having alkoxy group, such as n-butyl cellosolve.

Examples of the carboxylic acids include organic carboxylic acids having 7 or more carbon atoms, such as caprylic acid and 2-ethylhexanoic acid. Examples of the aldehydes include aldehydes having 7 or more carbon atoms, such as capric aldehyde and 2-ethylhexyl aldehyde.

Examples of the amines include amines having 6 or more carbon atoms, such as heptylamine, octylamine, nonylamine, laurylamine and 2-ethylhexylamine.

As the catalyst components (c), the above alcohols are preferable, and ethanol, propanol, butanol, isobutanol, hexanol, 2-ethylhexanole, decanol, etc. are particularly preferable.

Although the amounts of the magnesium compound and the catalyst component (c) used for preparing the solid adduct or the magnesium compound in a liquid state vary depending upon the types thereof, the contact conditions, etc., the magnesium compound is used in an amount of 0.1 to 20 mol/liter, preferably 0.5 to 5 mol/liter, based on the unit volume of the catalyst component (c). Further, a medium inert to the solid catalyst (c) is also employable in combination, when necessary. Preferred examples of the media include publicly known hydrocarbon compounds, such as heptane, octane and decane.

The compositional ratio between magnesium in the resulting solid adduct or the magnesium compound in a liquid state and the catalyst component (c) varies depending upon the compounds used and cannot be defined indiscriminately, but the amount of the catalyst component (c) is preferably not less than 2.0 mol, more preferably not less than 2.2 mol, still more preferably not less than 2.3 mol, particularly preferably not less than 2.4 mol but not more than 5 mol, based on 1 mol of magnesium in the magnesium compound.

Such cyclic ester compounds (a) and (b) and catalyst component (c) as above may be considered to belong to a component that is called an electron donor by a person skilled in the art. The electron donor component is known to exhibit an effect of enhancing stereoregularity of the resulting polymer, an effect of controlling a compositional distribution of the resulting copolymer, a coagulant effect of controlling particle shape or particle diameter of a catalyst particle, etc., with keeping high activity of the catalyst.

It is thought that the cyclic ester compound (a) further exhibits an effect of controlling a molecular weight distribution because the cyclic ester compound (a) itself is an electron donor.

In the solid titanium catalyst component (I) of the invention, the halogen/titanium ratio by atom (namely, number of moles of halogen atom/number of moles of titanium atom) is desired to be in the range of 2 to 100, preferably 4 to 90;

the cyclic ester compound (a)/titanium ratio by mol (namely, number of moles of cyclic ester compound (a)/number of moles of titanium atom) and the cyclic ester compound (b)/titanium atom ratio by mol (namely, number of moles of cyclic ester compound (b)/number of moles of titanium atom) are each desired to be in the range of 0.01 to 100, preferably 0.2 to 10; and the catalyst component (c)/titanium atom ratio by mol is desired to be in the range of 0 to 100, preferably 0 to 10.

With regard to a preferred ratio of the cyclic ester compound (a) to the cyclic ester compound (b), the lower limit of the value (% by mol) of 100×cyclic ester compound (a)/(cyclic ester compound (a)+cyclic ester compound (b)) is 10% by mol, preferably 30% by mol, more preferably 40% by mol, particularly preferably 50% by mol, and the upper limit thereof is 99% by mol, preferably 90% by mol, more preferably 85% by mol, particularly preferably 80% by mol.

The magnesium/titanium ratio by atom (namely, number of moles of magnesium atom/number of moles of titanium atom) is desired to be in the range of 2 to 100, preferably 4 to 50.

The content of a component which may be contained in addition to the cyclic ester compounds (a) and (b), e.g., the catalyst component (c), is preferably not more than 20% by weight, more preferably not more than 10% by weight, based on 100% by weight of the cyclic ester compounds (a) and (b).

As more detailed conditions for preparing the solid titanium catalyst component (I), the conditions described in, for example, EP585869A1 (European Patent Kokai No. 0585869) and the patent document 2 are preferably used, except that the cyclic ester compounds (a) and (b) are used.

Olefin Polymerization Catalyst

The olefin polymerization catalyst of the invention comprises:
the above-mentioned solid titanium catalyst component (I) of the invention, and
an organometallic compound catalyst component (II) containing a metallic element selected from the group 1, the group 2 and the group 13 of the periodic table.

Organometallic Compound Catalyst Component (II)

As the organometallic compound catalyst component (II), a compound containing the group 13 metal, such as an organoaluminum compound, an alkylated complex compound of the group 1 metal and aluminum, or an oragnometallic compound of the group 2 metal is employable. Of such compounds, the organoaluminum compound is preferable.

Preferred examples of the organometallic compound catalyst components (II) include organometallic compound catalyst components described in publicly known literatures such as the aforesaid EP585869A1.

Electron Donor (III)

The olefin polymerization catalyst of the invention may contain the previously described electron donor (III) together with the organometallic compound catalyst component (II), when necessary. The electron donor (III) is preferably an organosilicon compound. The organosilicon compound is, for example, a compound represented by the following formula (3).

$$R_n Si(OR')_{4-n} \quad (3)$$

wherein R and R' are each a hydrocarbon group, and n is an integer of 0<n<4.

Examples of the organosilicon compounds represented by the formula (3), which can be used in the invention, include diisopropyldimethoxysilane, t-butylmethyldimethoxysilane, t-butylmethyldiethoxysilane, t-amylmethyldiethoxysilane, dicyclohexyldimethoxysilane, cyclohexylmethyldimethoxysilane, cyclohexylmethyldiethoxysilane, vinyltrimethoxysilane, vinyltriethoxysilane, t-butyltriethoxysilane, phenyltriethoxysilane, cyclohexyltrimethoxysilane, cyclopentyltrimethoxysilane, 2-methylcyclopentyltrimethoxysilane, cyclopentyltriethoxysilane, dicyclopentyldimethoxysilane, dicyclopentyldiethoxysilane, tricyclopentylmethoxysilane, dicyclopentylmethylmethoxysilane, dicyclopentylethylmethoxysilane, and cyclopentyldimethylethoxysilane.

Of these, vinyltriethoxysilane, diphenyldimethoxysilane, dicyclohexyldimethoxysilane, cyclohexylmethyldimethoxysilane and dicyclopentyldimethoxysilane are preferably employed.

A silane compound represented by the following formula (4), which is described in International Publication No. 2004/016662, is also a preferred example of the organosilicon compound.

$$Si(OR^a)_3(NR^b R^c) \quad (4)$$

In the formula (4), $R^a$ is a hydrocarbon group of 1 to 6 carbon atoms. As $R^a$, an unsaturated or saturated aliphatic hydrocarbon group of 1 to 6 carbon atoms or the like can be mentioned, and a hydrocarbon group of 2 to 6 carbon atoms is particularly preferable. Examples of such hydrocarbon groups include methyl group, ethyl group, n-propyl group, isopropyl group, n-butyl group, isobutyl group, sec-butyl group, n-pentyl group, isopentyl group, cyclopentyl group, n-hexyl group and cyclohexyl group. Of these, ethyl group is particularly preferable.

In the formula (4), $R^b$ is a hydrocarbon group of 1 to 12 carbon atoms or hydrogen. As $R^b$, an unsaturated or saturated aliphatic hydrocarbon group of 1 to 12 carbon atoms, hydrogen or the like can be mentioned. Examples of $R^b$ include hydrogen atom, methyl group, ethyl group, n-propyl group, isopropyl group, n-butyl group, isobutyl group, sec-butyl group, n-pentyl group, isopentyl group, cyclopentyl group, n-hexyl group, cyclohexyl group and octyl group. Of these, ethyl group is particularly preferable.

In the formula (4), $R^c$ is a hydrocarbon group of 1 to 12 carbon atoms or hydrogen. As $R^c$, an unsaturated or saturated aliphatic hydrocarbon group of 1 to 12 carbon atoms, hydrogen or the like can be mentioned. Examples of such hydrocarbon groups include methyl group, ethyl group, n-propyl group, isopropyl group, n-butyl group, isobutyl group, sec-butyl group, n-pentyl group, isopentyl group, cyclopentyl group, n-hexyl group, cyclohexyl group and octyl group. Of these, ethyl group is particularly preferable.

Examples of the compounds represented by the formula (4) include:
dimethylaminotriethoxysilane,
diethylaminotriethoxysilane,
diethylaminotrimethoxysilane,
diethylaminotri-n-propoxysilane,
di-n-propylaminotriethoxysilane,
methyl-n-propylaminotriethoxysilane,
t-butylaminotriethoxysilane,
ethyl-n-propylaminotriethoxysilane,
ethylisopropylaminotriethoxysilane, and
methylethylaminotriethoxysilane.

Another example of the organosilicon compound is a compound represented by the following formula (5).

$$RNSi(OR^a)_3 \quad (5)$$

In the formula (5), RN is a cyclic amino group. The cyclic amino group is, for example, perhydroquinolino group, perhydroisoquinolino group, 1,2,3,4-tetrahydroquinolino group, 1,2,3,4-tetrahydroisoquinolino group or octamethyleneimino group.

Examples of the compounds represented by the formula (5) include:
(perhydroquinolino)triethoxysilane,
(perhydroisoquinolino)triethoxysilane,
(1,2,3,4-tetrahydroquinolino)triethoxysilane,
(1,2,3,4-tetrahydroisoquinolino)triethoxysilane, and
octamethyleneiminotriethoxysilane.

These organosilicon compounds can be used in combination of two or more kinds.

A preferred example of another useful compound as the electron donor (III) is a polyether compound that is a compound having two or more ether linkages though an aromatic carboxylic acid ester and/or plural carbon atoms.

Of such polyether compounds, 1,3-diethers are preferable, and 2-isopropyl-2-isobutyl-1,3-dimethoxypropane, 2,2-diisobutyl-1,3-dimethoxypropane, 2-isopropyl-2-isopentyl-1,3-dimethoxypropane, 2,2-dicyclohexyl-1,3-dimethoxypropane and 2,2-bis(cyclohexylmethyl)-1,3-dimethoxypropane are particularly preferable.

These compounds can be used singly or in combination of two or more kinds.

The olefin polymerization catalyst of the invention may further contain other components useful for olefin polymerization in addition to the above components, when necessary. Examples of the other components include a carrier such as silica, an antistatic agent, a particle coagulant and a storage stabilizer.

Process for Preparing Olefin Polymer

The process for preparing an olefin polymer according to the invention comprises carrying out olefin polymerization using the olefin polymerization catalyst of the invention. In the present invention, the meaning of the "polymerization" sometimes includes not only homopolymerization but also copolymerization such as random copolymerization or block copolymerization.

In the process for preparing an olefin polymer of the invention, it is also possible to carry out polymerization in the presence of a prepolymerized catalyst that is obtained by prepolymerizing an α-olefin in the presence of the olefin polymerization catalyst of the invention. This prepolymerization is carried out by prepolymerizing an α-olefin in an amount of 0.1 to 1000 g, preferably 0.3 to 500 g, particularly preferably 1 to 200 g, based on 1 g of the olefin polymerization catalyst.

In the prepolymerization, a catalyst having a higher concentration than the catalyst concentration in the system of the polymerization can be employed.

The concentration of the solid titanium catalyst component (I) in the prepolymerization is desired to be in the range of usually about 0.001 to 200 mmol, preferably about 0.01 to 50 mmol, particularly preferably 0.1 to 20 mmol, in terms of titanium atom, based on 1 liter of the liquid medium.

The amount of the organometallic compound catalyst component (II) in the prepolymerization has only to be such an amount that a polymer of 0.1 to 1000 g, preferably 0.3 to 500 g, is formed based on 1 g of the solid titanium catalyst component (I), and the amount thereof is desired to be in the range of usually about 0.1 to 300 mol, preferably about 0.5 to 100 mol, particularly preferably 1 to 50 mol, based on 1 mol of titanium atom in the solid titanium catalyst component (I).

In the prepolymerization, the aforesaid electron donor (III) can be also used, when necessary, and in this case, the electron donor is used in an amount of 0.1 to 50 mol, preferably 0.5 to 30 mol, more preferably 1 to 10 mol, based on 1 mol of titanium atom in the solid titanium catalyst component (I).

The prepolymerization can be carried out by adding an olefin and the catalyst components to an inert hydrocarbon medium, and can be carried out under mild conditions.

Examples of the inert hydrocarbon media used in this case include:

aliphatic hydrocarbons, such as propane, butane, pentane, hexane, heptane, octane, decane, dodecane and kerosine;

alicyclic hydrocarbons, such as cyclohexane, cycloheptane, methylcycloheptane, 4-cyclohexane, 4-cycloheptane and methyl-4-cycloheptane;

aromatic hydrocarbons, such as benzene, toluene and xylene;

halogenated hydrocarbons, such as ethylene chloride and chlorobenzene, and mixtures of these hydrocarbons.

Of the above inert hydrocarbon media, aliphatic hydrocarbons are particularly preferably employed. In the case of using the inert hydrocarbon medium, the prepolymerization is preferably carried out by a batch process.

On the other hand, the prepolymerization can be carried out by the use of an olefin itself as a solvent, or the prepolymerization can be carried out substantially in the absence of a solvent. In this case, the prepolymerization is preferably carried out continuously.

The olefin used in the prepolymerization may be the same as or different from an olefin used in the later-described polymerization, and specifically, the olefin is desirably propylene.

The temperature in the prepolymerization is desired to be in the range of usually about −20 to +100° C., preferably about −20 to +80° C., more preferably 0 to +40° C.

Next, polymerization that is carried out after the above prepolymerization or without performing the prepolymerization is described.

Example of olefins employable (i.e., to be polymerized) in the polymerization include α-olefins of 3 to 20 carbon atoms, specifically, straight-chain olefins, such as propylene, 1-butene, 1-pentene, 1-hexene, 1-octene, 1-decene, 1-dodecene, 1-tetradecene, 1-hexadecene, 1-octadecene and 1-eicosene, and branched olefins, such as 4-methyl-1-pentene, 3-methyl-1-pentene and 3-methyl-1-butene. Of these, propylene, 1-butene, 1-pentene and 4-methyl-1-pentene are preferable. From the viewpoint that merits of a polymer having a wide molecular weight distribution are apt to appear in a resin of high rigidity, propylene, 1-butene and 4-methyl-1-pentene are particularly preferable.

Together with these α-olefins, ethylene, aromatic vinyl compounds, such as styrene and allylbenzene, and alicyclic vinyl compounds, such as vinylcyclohexane and vinylcycloheptane, are also employable. Further, together with ethylene and the α-olefins, compounds having many unsaturated bonds, e.g., dienes (conjugated dienes and non-conjugated dienes), such as cyclopentene, cycloheptene, norbornene, tetracyclododecene, isoprene and butadiene, are also employable as polymerization raw materials. These compounds may be used singly, or may be used in combination of two or more kinds. (The above ethylene or olefin, which may be used together with the "α-olefin of 3 to 20 carbon atoms", is also referred to as "other olefin" hereinafter.)

Of the other olefins, ethylene or an aromatic vinyl compound is preferable. Further, other olefins such as ethylene may be used in combination so long as the amount thereof is a small amount, for example, not more than 10% by weight, preferably not more than 5% by weight, in 100% by weight of the total amount of the olefins.

In the present invention, the prepolymerization and the polymerization can be carried out by any of a bulk polymerization process, a liquid phase polymerization process, such as solution polymerization or suspension polymerization, and a vapor phase polymerization process.

When the polymerization adopts a reaction mode of slurry polymerization, inert hydrocarbon that is used in the aforesaid prepolymerization can be used as the reaction solvent, or an olefin that is a liquid at the reaction temperature can be used as the reaction solvent.

In the polymerization in the process for preparing a polymer of the invention, the solid titanium catalyst component (I) is used in an amount of usually about 0.0001 to 0.5 mmol, preferably about 0.005 to 0.1 mmol, in terms of titanium atom, based on 1 liter of the polymerization volume. The organometallic compound catalyst component (II) is used in an amount of usually about 1 to 2000 mol, preferably about 5 to 500 mol, based on 1 mol of titanium atom in the prepolymerization catalyst component in the polymerization system. When the electron donor (III) is used, the amount thereof is in the range of 0.001 to 50 mol, preferably 0.01 to 30 mol, particularly preferably 0.05 to 20 mol, based on 1 mol of the organometallic compound catalyst component (II).

If the polymerization is carried out in the presence of hydrogen, the molecular weight of the resulting polymer can be controlled, and a polymer having a high melt flow rate is obtained.

In the polymerization in the invention, the temperature for polymerizing an olefin is in the range of usually about 20 to 200° C., preferably about 30 to 100° C., more preferably 50 to 90° C. The pressure is in the range of usually atmospheric pressure to 100 kgf/cm$^2$ (9.8 MPa), preferably about 2 to 50 kgf/cm$^2$ (0.20 to 4.9 MPa). In the process for preparing a polymer of the invention, the polymerization can be carried out by any of a batch process, a semi-continuous process and a continuous process. Further, the polymerization can be carried out in two or more steps different in reaction conditions. When such multistep polymerization is carried out, it becomes possible to further widen the molecular weight distribution of the olefin polymer.

The olefin polymer thus obtained may be any of a homopolymer, a random copolymer and a block copolymer.

When polymerization of an olefin, particularly polymerization of propylene, is carried out by the use of such an olefin polymerization catalyst as above, a propylene-based polymer of high stereoregularity having a decane-insoluble component content of not less than 70%, preferably not less than 85%, particularly preferably not less than 90%, is obtained.

According to the process for preparing an olefin polymer of the invention, further, polyolefin, particularly polypropylene, having a wide molecular weight distribution can be obtained even if multistep polymerization is not carried out but polymerization of few steps such as single-step polymerization is carried out. The process for preparing an olefin polymer of the invention is characterized in that an olefin polymer whose high-molecular weight component ratio is higher and whose low-molecular weight component ratio (said low-molecular weight component being particularly called "sticky component") is lower than those of a conventional olefin polymer having an equivalent melt flow rate is often obtained. These characteristics can be confirmed by the later-described gel permeation chromatography (GPC) measurement, and a polymer whose Mw/Mn value and Mz/Mw value are both high can be obtained.

Polypropylene obtained by the use of a conventional solid titanium catalyst component containing magnesium, titanium, halogen and an electron donor generally has an Mw/Mn value of not more than 5 and an Mz/Mw value of less than 4 in the MFR region of 1 to 10 g/10 min, said Mw/Mn value and Mz/Mw value being determined by GPC measurement and being indications of molecular weight distribution. However, when the process for preparing an olefin polymer of the invention is used, an olefin polymer having an Mw/Mn value of 6 to 30, preferably 7 to 20, can be obtained under the same polymerization conditions as above. Further, an olefin polymer having an Mz/Mw value of preferably 4 to 15, more preferably 4.5 to 10, can be obtained. According to the process for preparing an olefin polymer of the invention, a polymer having a high Mz/Mw value is often obtained. The upper limit of the Mz/Mn value is preferably 300, more preferably 250, particularly preferably 200. According to the process for preparing the polypropylene resin, a polymer having a high Mz/Mw value and a high Mz/Mn value is often obtained.

It is regarded as a matter of common sense by a person skilled in the art that polypropylene having a high Mw/Mn value is excellent in moldability and rigidity. On the other hand, a high Mz/Mw value indicates that the content of a high-molecular weight component is high, and the resulting polypropylene is expected to have a high melt tension and excellent moldability.

When the process for preparing an olefin polymer of the invention is used, a polymer having a wide molecular weight distribution can be obtained even if multistep polymerization is not carried out. Therefore, there is a possibility that the polymer production apparatus can be made simpler. Further, when the conventional multistep polymerization is applied, it is expected that a polymer excellent in melt tension and moldability can be obtained.

As other methods to obtain a polymer having a wide molecular weight distribution, there are a method of dissolving/mixing polymers of different molecular weights and a method of melt kneading them. However, polymers obtained by these methods are sometimes insufficient in enhancement of melt tension and moldability considering the relatively complicated operations. The reason is presumably that the polymers of different molecular weights are hardly miscible with one another basically. On the other hand, the polymer obtained by the process for preparing an olefin polymer of the invention is expected to have a high melt tension and excellent moldabilty because polymers having different molecular weights of extremely wide range are mixed to the catalyst level, namely nanolevel.

Further, the process for preparing an olefin polymer of the invention is characterized in that an olefin polymer having controlled stereoregularity is obtained. These characteristics can be confirmed by the fact that an olefin polymer containing a small amount of a decane-soluble component can be obtained.

EXAMPLES

The present invention is further described with reference to the following examples, but it should be construed that the invention is in no way limited to those examples.

In the following examples, bulk specific gravity, melt flow rate, amount of decane-soluble (-insoluble) component, molecular weight distribution, etc. were measured by the following methods.

(1) Bulk Density (BD)

Bulk density was measured in accordance with JIS K-6721.

(2) Melt Flow Rate (MFR)

Melt flow rate was measured in accordance with ASTM D1238E, and the measuring temperature was set at 230° C.

(3) Amount of Decane-Soluble (-Insoluble) Component

In a glass measuring container, about 3 g of a propylene polymer (weight was measured to the unit of $10^{-4}$ g, and this weight is represented by "b" (gram(s)) in the following formulas), 500 ml of decane and a small amount of a decane-soluble heat stabilizer were placed, and with stirring by a stirrer, they were heated to 150° C. over a period of 2 hours in a nitrogen atmosphere to dissolve the propylene polymer. The resulting solution was maintained at 150° C. for 2 hours and then slowly cooled down to 23° C. over a period of 8 hours. The resulting liquid containing a precipitate of the propylene polymer was filtered under reduced pressure through a glass filter of the 25G-4 standard manufactured by Iwata Glass Co., Ltd. Then, 100 ml of a filtrate was withdrawn and vacuum dried to obtain a part of a decane-soluble component. The weight of the decane-soluble component was measured to the unit of $10^{-4}$ g, and this weight is represented by "a" (gram(s)) in the following formulas. After this operation, the amount of the decane-soluble component was determined by the following formula.

Content of decane-soluble component=100×(500×$a$)/(100$b$)

Content of decane-insoluble component=100−100×(500×$a$)/(100$b$)

(4) Molecular Weight Distribution

Liquid chromatograph: ALC/GPC 150-C plus model (differential refractometer detector integral type) manufactured by Waters Corporation Column: Two of GMH6-HT (available from Tosoh Corporation) and two of GMH6-HTL (available from Tosoh Corporation) were connected in series.

Mobile phase medium: o-dichlorobenzene

Flow rate: 1.0 ml/min

Measuring temperature: 140° C.

Method for preparing calibration curve: Standard polystyrene samples were used.

Sample concentration: 0.10% (w/w)

Amount of sample solution: 500 µl

The measurement was carried out under the above conditions, and the resulting chromatogram was analyzed by a publicly known method to calculate an Mw/Mn value and an Mz/Mw value. The measuring time per sample was 60 minutes.

Example 1

Preparation of Solid Titanium Catalyst Component (α1)

A high-speed stirring apparatus having an internal volume of 2 liters (manufactured by Tokushu Kika Kogyo Co., Ltd.) was thoroughly purged with nitrogen, and then in this apparatus, 700 ml of purified decane, 10 g of commercially available magnesium chloride, 24.2 g of ethanol and 3 g of Rheodol SP-S20 (trade name, sorbitan distearate available from Kao Corporation) were placed. With stirring this suspension, the temperature of the system was raised, and at 120° C., the suspension was stirred at 800 rpm for 30 minutes.

Subsequently, with stirring the suspension at high speed so that a precipitate should not be formed, the suspension was transferred into a 2-liter glass flask (equipped with a stirrer) containing 1 liter of purified decane previously cooled to −10° C., by the use of a Teflon (trademark) tube having an inner diameter of 5 mm. A solid formed by the transfer of the liquid was filtered off and sufficiently washed with purified n-heptane to obtain a solid adduct in which 2.8 mol of ethanol was coordinated based on 1 mol of magnesium chloride.

A decane suspension of 23 mmol (in terms of magnesium atom) of the above solid adduct was introduced in the whole amount into 100 ml of titanium tetrachloride kept at −20° C., with stirring, to obtain a mixed liquid. The mixed liquid was heated to 80° C. over a period of 5 hours. When a temperature of 80° C. was reached, diisobutyl 3,6-dimethylcyclohexane-1,2-dicarboxylate (mixture of cis form and trans form, DMCHIBU) was added in an amount of 0.14 mol based on 1 mol of magnesium atom of the solid adduct, and the temperature was raised up to 120° C. over a period of 40 minutes. When a temperature of 120° C. was reached, diisobutyl cyclohexane-1,2-dicarboxylate (mixture of cis form and trans form) was further added in an amount of 0.035 mol based on 1 mol of magnesium atom of the solid adduct. With stirring the mixture, the temperature was maintained at 120° C. for 90 minutes to perform reaction.

After the reaction of 90 minutes was completed, a solid part was collected by hot filtration, and this solid part was resuspended in 100 ml of titanium tetrachloride. Thereafter, the temperature was raised, and when a temperature of 130° C. was reached, the suspension was held for 45 minutes with stirring, to perform reaction. After the reaction of 45 minutes was completed, a solid part was collected by hot filtration again, and the solid part was sufficiently washed with decane at 100° C. and heptane until a titanium compound liberated in the wash liquid was not detected.

The solid titanium catalyst component (A1) prepared through the above operations was stored as a decane slurry, and a part of the slurry was dried for the purpose of examining catalytic composition.

Polymerization

In a polymerizer having an internal volume of 2 liters, 500 g of propylene and 1N liter of hydrogen were placed at room temperature, then 0.5 mmol of triethylaluminum, 0.1 mmol of cyclohexylmethyldimethoxysilane and 0.004 mmol (in terms of titanium atom) of the solid titanium catalyst component (α1) were added, and the interior of the polymerizer was rapidly heated up to 70° C. After polymerization was performed at 70° C. for 1 hour, the reaction was terminated by the use of a small amount of methanol, and the polymerizer was purged of propylene. The resulting polymer particles were vacuum dried overnight at 80° C.

Activity of catalyst, and MFR, amount of decane-insoluble component, bulk specific gravity and molecular weight distribution (Mw/Mn, Mz/Mw) of the resulting polymer are set forth in Table 1.

Example 2

Preparation of Solid Titanium Catalyst Component (α2)

A solid titanium catalyst component (α2) was obtained in the same manner as in Example 1, except that 0.13 mol of diisobutyl 3,6-dimethylcyclohexane-1,2-dicarboxylate (mixture of cis form and trans form) and 0.04 mol of diisobutyl cyclohexane-1,2-dicarboxylate (mixture of cis form and trans form) were added.

Polymerization

Polymerization of propylene was carried out in the same manner as in Example 1, except that the solid titanium catalyst component (α2) was used instead of the solid titanium catalyst component (α1). The results are set forth in Table 1.

Example 3

Preparation of Solid Titanium Catalyst Component (α3)

A solid titanium catalyst component (α3) was obtained in the same manner as in Example 1, except that 0.12 mol of diisobutyl 3,6-dimethylcyclohexane-1,2-dicarboxylate (mixture of cis form and trans form) and 0.06 mol of diisobutyl cyclohexane-1,2-dicarboxylate (mixture of cis form and trans form) were added.

Polymerization

Polymerization of propylene was carried out in the same manner as in Example 1, except that the solid titanium catalyst component (α3) was used. The results are set forth in Table 1.

Example 4

Preparation of Solid Titanium Catalyst Component (α4)

A solid titanium catalyst component (α4) was obtained in the same manner as in Example 1, except that 0.09 mol of diisobutyl 3,6-dimethylcyclohexane-1,2-dicarboxylate (mixture of cis form and trans form) and 0.09 mol of diisobutyl cyclohexane-1,2-dicarboxylate (mixture of cis form and trans form) were added.
Polymerization Polymerization of propylene was carried out in the same manner as in Example 1, except that the solid titanium catalyst component (α4) was used. The results are set forth in Table 1.

Comparative Example 1

Synthesis of Solid Titanium Catalyst Component (β1)

A solid titanium catalyst component (β1) was obtained in the same manner as in Example 1, except that 0.175 mol of diisobutyl 3,6-dimethylcyclohexane-1,2-dicarboxylate (mixture of cis form and trans form) was added, and diisobutyl cyclohexane-1,2-dicarboxylate (mixture of cis form and trans form) was not added.
Polymerization Polymerization of propylene was carried out in the same manner as in Example 1, except that the solid titanium catalyst component (β1) was used. The results are set forth in Table 1.

Comparative Example 2

Synthesis of Solid Titanium Catalyst Component (β2)

A solid titanium catalyst component (β2) was obtained in the same manner as in Example 1, except that 0.175 mol of diisobutyl cyclohexane-1,2-dicarboxylate (mixture of cis form and trans form) was added at 80° C. instead of diisobutyl 3,6-dimethylcyclohexane-1,2-dicarboxylate (mixture of cis form and trans form), but the diisobutyl cyclohexane-1,2-dicarboxylate was not added at 120° C.
Polymerization Polymerization of propylene was carried out in the same manner as in Example 1, except that the solid titanium catalyst component (β2) was used. The results are set forth in Table 1.

Comparative Example 3

Preparation of Solid Titanium Catalyst Component (β3)

A solid titanium catalyst component (β3) was obtained in the same manner as in Example 1, except that 0.13 mol of diisobutyl 3,6-dimethylcyclohexane-1,2-dicarboxylate (mixture of cis form and trans form) was added, and 0.04 mol of 2-isopropyl-2-isobutyl-1,3-dimethoxypropane was added instead of diisobutyl cyclohexane-1,2-dicarboxylate (mixture of cis form and trans form).
Polymerization Polymerization of propylene was carried out in the same manner as in Example 1, except that the solid titanium catalyst component (β3) was used. The results are set forth in Table 1.

Comparative Example 4

Preparation of Solid Titanium Catalyst Component (β4)

A solid titanium catalyst component (β4) was obtained in the same manner as in Example 1, except that 0.12 mol of diisobutyl 3,6-dimethylcyclohexane-1,2-dicarboxylate (mixture of cis form and trans form) was added, and 0.06 mol of 2-isopropyl-2-isobutyl-1,3-dimethoxypropane was added instead of diisobutyl cyclohexane-1,2-dicarboxylate (mixture of cis form and trans form).
Polymerization Polymerization of propylene was carried out in the same manner as in Example 1, except that the solid titanium catalyst component (β4) was used. The results are set forth in Table 1.

Comparative Example 5

Preparation of Solid Titanium Catalyst Component (β5)

A solid titanium catalyst component (β5) was obtained in the same manner as in Example 1, except that 0.13 mol of diisobutyl 3,6-dimethylcyclohexane-1,2-dicarboxylate (mixture of cis form and trans form) was added, and 0.04 mol of diisobutyl phthalate was added instead of diisobutyl cyclohexane-1,2-dicarboxylate (mixture of cis form and trans form).
Polymerization Polymerization of propylene was carried out in the same manner as in Example 1, except that the solid titanium catalyst component (β5) was used. The results are set forth in Table 1.

Comparative Example 6

Preparation of Solid Titanium Catalyst Component (β6)

A solid titanium catalyst component (β6) was obtained in the same manner as in Example 1, except that 0.15 mol of diisobutyl phthalate was added instead of diisobutyl 3,6-dimethylcyclohexane-1,2-dicarboxylate (mixture of cis form and trans form), and diisobutyl cyclohexane-1,2-dicarboxylate (mixture of cis form and trans form) was not added.
Polymerization Polymerization of propylene was carried out in the same manner as in Example 1, except that the solid titanium catalyst component (β6) was used. The results are set forth in Table 1.

Comparative Example 7

Preparation of Solid Titanium Catalyst Component (β7)

A solid titanium catalyst component (β7) was obtained in the same manner as in Example 1, except that 0.15 mol of 2-isopropyl-2-isobutyl-1,3-dimethoxypropane was added instead of diisobutyl 3,6-dimethylcyclohexane-1,2-dicarboxylate (mixture of cis form and trans form), and diisobutyl cyclohexane-1,2-dicarboxylate (mixture of cis form and trans form) was not added.
Polymerization Polymerization of propylene was carried out in the same manner as in Example 1, except that the solid titanium catalyst component (β7) was used. The results are set forth in Table 1.

Example 5

Polymerization

Polymerization of propylene was carried out in the same manner as in Example 1, except that the solid titanium catalyst component (α4) was used, and dicyclopentyldimethoxysilane was used instead of cyclohexylmethyldimethoxysilane. The results are set forth in Table 2.

Example 6

Preparation of Solid Titanium Catalyst Component (α5)

75 g of anhydrous magnesium chloride, 280.3 g of decane and 308.3 g of 2-ethylhexyl alcohol were subjected to thermal reaction at 130° C. for 3 hours to give a homogeneous solution, then to this solution was added 17.7 g of ethyl benzoate, and they were further stirred and mixed at 130° C. for 1 hour.

The homogeneous solution thus obtained was cooled down to room temperature, and then the whole amount of 38 ml of this homogeneous solution was dropwise added to 100 ml of titanium tetrachloride kept at −24° C., over a period of 45 minutes with stirring at a revolution speed of 200 rpm. After the addition was completed, the temperature of the mixed liquid was raised to 80° C. over a period of 4.6 hours, and when the temperature became 80° C., to the mixed liquid was added diisobutyl 3,6-dimethylcyclohexane-1,2-dicarboxylate (mixture of cis form and trans form) in an amount of 0.0875 mol time the amount of Mg atom. The temperature was raised again, and when a temperature of 120° C. was reached, diisobutyl cyclohexane-1,2-dicarboxylate was added in an amount of 0.0625 mol time the amount of Mg atom. Thereafter, the mixture was maintained at this temperature for 35 minutes. After the reaction was completed, a solid part was collected by hot filtration, and this solid part was resuspended in 100 ml of titanium tetrachloride, followed by performing thermal reaction again at 120° C. for 35 minutes. After the reaction was completed, a solid part was collected by hot filtration again, and the solid part was sufficiently washed with decane at 100° C. and hexane until a titanium compound liberated in the wash liquid was not detected. The solid titanium catalyst component (α5) prepared through the above operations was stored as a decane slurry, and a part of the slurry was dried for the purpose of examining catalytic composition. The solid titanium catalyst component (α5) had composition of 3.0% by mass of titanium, 18% by mass of magnesium, 8.6% by mass of diisobutyl 3,6-dimethylcyclohexane-1,2-dicarboxylate, 4.2% by mass of diisobutyl cyclohexane-1,2-dicarboxylate and 0.6% by mass of a 2-ethylhexyl alcohol residue.

Polymerization

In a polymerizer having an internal volume of 2 liters, 500 g of propylene and 1N liter of hydrogen were placed at room temperature, then 0.5 mmol of triethylaluminum, 0.1 mmol of cyclohexylmethyldimethoxysilane and 0.004 mmol (in terms of titanium atom) of the solid titanium catalyst component (α5) were added, and the interior of the polymerizer was rapidly heated up to 70° C. After polymerization was performed at 70° C. for 1 hour, the reaction was terminated by the use of a small amount of methanol, and the polymerizer was purged of propylene. The resulting polymer particles were vacuum dried overnight at 80° C. Activity, MFR, amount of decane-insoluble component, bulk specific gravity and molecular weight distribution (Mw/Mn, Mz/Mw) are set forth in Table 2.

Example 7

Polymerization

Polymerization of propylene was carried out in the same manner as in Example 6, except that dicyclopentyldimethoxysilane was used instead of cyclohexylmethyldimethoxysilane. The results are set forth in Table 2.

Comparative Example 8

Polymerization

Polymerization of propylene was carried out in the same manner as in Example 1, except that the solid titanium catalyst component (β2) was used, and dicyclopentyldimethoxysilane was used instead of cyclohexylmethyldimethoxysilane. The results are set forth in Table 2.

Comparative Example 9

Preparation of Solid Titanium Catalyst Component (β9)

75 g of anhydrous magnesium chloride, 280.3 g of decane and 308.3 g of 2-ethylhexyl alcohol were subjected to thermal reaction at 130° C. for 3 hours to give a homogeneous solution, then to this solution was added 17.7 g of ethyl benzoate, and they were further stirred and mixed at 130° C. for 1 hour.

The homogeneous solution thus obtained was cooled down to room temperature, and then the whole amount of 38 ml of this homogeneous solution was dropwise added to 100 ml of titanium tetrachloride kept at −24° C., over a period of 45 minutes with stirring at a revolution speed of 200 rpm. After the addition was completed, the temperature of the mixed liquid was raised to 80° C. over a period of 4.6 hours, and when the temperature became 80° C., to this mixed liquid was added diisobutyl 3,6-dimethylcyclohexane-1,2-dicarboxylate (mixture of cis form and trans form) in an amount of 0.15 mol time the amount of Mg atom. The temperature was raised again, and when a temperature of 120° C. was reached, this temperature was maintained for 35 minutes. After the reaction was completed, a solid part was collected by hot filtration, and this solid part was resuspended in 100 ml of titanium tetrachloride, followed by performing thermal reaction again at 120° C. for 35 minutes. After the reaction was completed, a solid part was collected by hot filtration again, and the solid part was sufficiently washed with decane at 100° C. and hexane until a titanium compound liberated in the wash liquid was not detected. The solid titanium catalyst component (β9) prepared through the above operations was stored as a decane slurry, and a part of the slurry was dried for the purpose of examining catalytic composition. The solid titanium catalyst component (β9) had composition of 2.8% by mass of titanium, 17% by mass of magnesium, 11.5% by mass of diisobutyl 3,6-dimethylcyclohexane-1,2-dicarboxylate and 0.6% by mass of a 2-ethylhexyl alcohol residue.

Polymerization

In a polymerizer having an internal volume of 2 liters, 500 g of propylene and 1N liter of hydrogen were placed at room temperature, then 0.5 mmol of triethylaluminum, 0.1 mmol of cyclohexylmethyldimethoxysilane and 0.004 mmol (in terms of titanium atom) of the solid titanium catalyst component (β9) were added, and the interior of the polymerizer was rapidly heated up to 70° C. After polymerization was performed at 70° C. for 1 hour, the reaction was terminated by the use of a small amount of methanol, and the polymerizer was purged of propylene. The resulting polymer particles were vacuum dried overnight at 80° C. Activity, MFR, amount of decane-insoluble component, bulk specific gravity and molecular weight distribution (Mw/Mn, Mz/Mw) are set forth in Table 2.

Comparative Example 10

Polymerization

Polymerization of propylene was carried out in the same manner as in Comparative Example 9, except that the solid titanium catalyst component (β9) was used, and dicyclopentyldimethoxysilane was used instead of cyclohexylmethyldimethoxysilane. The results are set forth in Table 2.

TABLE 1

| | Electron donor (mol %) | | | | Activity | BD | MFR | Amount of C10 insoluble component | | |
|---|---|---|---|---|---|---|---|---|---|---|
| | (a) | (b) | Phthalate | 1,3-Diether | Kg-PP/g-cat. | g/ml | g/10 min | wt % | Mw/Mn | Mz/Mw |
| Ex. 1 | 80 | 20 | — | — | 34.2 | 0.46 | 2.4 | 98.1 | 14.6 | 10.8 |
| Ex. 2 | 75 | 25 | — | — | 35.5 | 0.49 | 2.1 | 98.2 | 14.4 | 9.8 |
| Ex. 3 | 67 | 33 | — | — | 36.2 | 0.49 | 2.4 | 98.2 | 14.0 | 8.7 |
| Ex. 4 | 50 | 50 | — | — | 34.6 | 0.50 | 2.3 | 98.0 | 14.5 | 7.5 |
| Comp. Ex. 1 | 100 | 0 | — | — | 32.7 | 0.48 | 2.9 | 98.0 | 13.4 | 12.6 |
| Comp. Ex. 2 | 0 | 100 | — | — | 25.0 | 0.47 | 7.0 | 96.7 | 9.4 | 4.5 |
| Comp. Ex. 3 | 75 | — | — | 25 | 38.0 | 0.47 | 3.6 | 98.7 | 9.5 | 7.7 |
| Comp. Ex. 4 | 67 | — | — | 33 | 40.7 | 0.49 | 4.4 | 98.7 | 9.1 | 7.2 |
| Comp. Ex. 5 | 75 | — | 25 | — | 32.0 | 0.49 | 3.3 | 98.2 | 11.6 | 10.2 |
| Comp. Ex. 6 | 0 | — | 100 | — | 32.5 | 0.49 | 4.0 | 98.5 | 5.8 | 3.8 |
| Comp. Ex. 7 | 0 | — | — | 100 | 46.6 | 0.49 | 8.5 | 98.5 | 5.1 | 3.2 |

(a): diisobutyl 3,6-dimethylcyclohexane-1,2-dicarboxylate (DMCHIBU)
(b): diisobutyl cyclohexane-1,2-dicarboxylate
Phthalate: diisobutyl phthalate
1,3-Diether: 2-isopropyl-2-isobutyl-1,3-dimethoxypropane

TABLE 2

| | Solid titanium catalyst component | Electron donor (III) | Activity kg-PP/g-Cat. | BD g/ml | MFR g/10 min | Amount of C10 insoluble component wt % | Mw/Mn | Mz/Mw |
|---|---|---|---|---|---|---|---|---|
| Ex. 4 | α4 | CMMS | 34.6 | 0.50 | 2.3 | 98.0 | 14.5 | 7.5 |
| Ex. 5 | | DCPMS | 34.6 | 0.47 | 1.2 | 98.5 | — | — |
| Ex. 6 | α5 | CMMS | 36.1 | 0.42 | 5.8 | 98.0 | 14.4 | 9.3 |
| Ex. 7 | | DCPMS | 37.7 | 0.43 | 1.5 | 98.5 | 14.7 | 10.6 |
| Comp. Ex. 1 | β2 | CMMS | 32.7 | 0.48 | 2.9 | 98.0 | 13.4 | 12.6 |
| Comp. Ex. 8 | | DCPMS | 34.3 | 0.48 | 3.6 | 98.1 | 14.6 | 13.0 |
| Comp. Ex. 9 | β9 | CMMS | 28.5 | 0.42 | 3.0 | 97.7 | 13.9 | 8.9 |
| Comp. Ex. 10 | | DCPMS | 31.5 | 0.44 | 1.5 | 97.8 | — | — |

CMMS: cyclohexylmethyldimethoxysilane
DCPMS: dicyclopentyldimethoxysilane

In FIG. 1, a relationship between the proportion of DMCHIBU added and the Mw/Mn value is shown.

The invention claimed is:

1. A solid titanium catalyst component (I) comprising titanium, magnesium, halogen, a cyclic ester compound (a) represented by the following formula (1) and a cyclic ester compound (b) represented by the following formula (2), wherein the combining molar ratio of the cyclic ester compound (a) to the cyclic ester compound (b) ((cyclic ester compound (a)/(cyclic ester compound (a)+cyclic ester compound (b)))×100 (% by mol)) is 50-90% by mol:

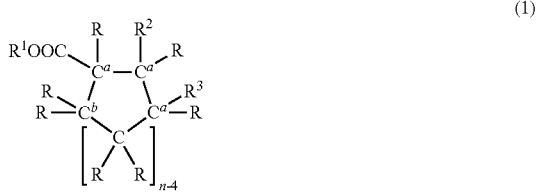

(1)

wherein n is an integer of 5 to 10,
$R^2$ and $R^3$ are each independently $COOR^1$ or R, at least one of $R^2$ and $R^3$ is $COOR^1$, and a single bond (except $C^a$—$C^a$ bond, and $C^a$—$C^b$ bond in the case where $R^3$ is R) in the cyclic skeleton may be replaced with a double bond, $R^1$ is each independently a monovalent hydrocarbon group of 1 to 20 carbon atoms,
plural R are each independently an atom or a group selected from a hydrogen atom, a hydrocarbon group of 1 to 20 carbon atoms, a halogen atom, a nitrogen-containing group, an oxygen-containing group, a phosphorous-containing group, a halogen-containing group and a silicon-containing group, and they may be bonded to one another to from a ring, but at least one R is not a hydrogen atom, and
in a skeleton of the ring formed by bonding of plural R to one another may be contained a double bond, and when two or more $C^a$ to each of which $COOR^1$ is bonded are contained in the skeleton of the ring, the number of carbon atoms to constitute the skeleton of the ring is 5 to 10;

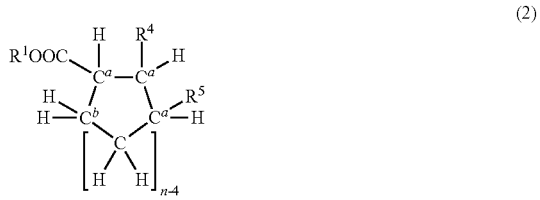

(2)

wherein n is an integer of 5 to 10, and
$R^4$ and $R^5$ are each independently $COOR^1$ or a hydrogen atom, at least one of $R^4$ and $R^5$ is $COOR^1$, $R^1$ is each independently a monovalent hydrocarbon group of 1 to 20 carbon atoms, and a single bond (except $C^a$—$C^a$ bond and $C^a$—$C^b$ bond in the cyclic skeleton may be replaced with a double bond).

2. The solid titanium catalyst component (I) as claimed in claim 1, wherein in the formulas (1) and (2), all the bonds between carbon atoms in the cyclic skeleton are single bonds.

3. The solid titanium catalyst component (I) as claimed in claim 1, wherein in the formulas (1) and (2), n is 6.

4. The solid titanium catalyst component (I) as claimed in claim 1, wherein the cyclic ester compound (a) is represented by the following formula (1a) and the cyclic ester compound (b) is represented by the following formula (2a);

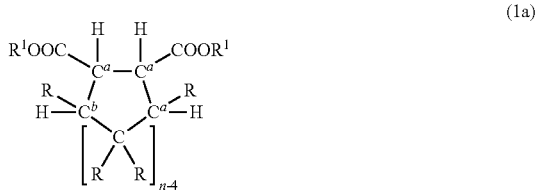

(1a)

wherein n is an integer of 5 to 10,
a single bond (except $C^a$—$C^a$ bond and $C^a$—$C^b$ bond) in the cyclic skeleton may be replaced with a double bond,
$R^1$ is each independently a monovalent hydrocarbon group of 1 to 20 carbon atoms,
plural R are each independently an atom or a group selected from a hydrogen atom, a hydrocarbon group of 1 to 20 carbon atoms, a halogen atom, a nitrogen-containing group, an oxygen-containing group, a phosphorous-containing group, a halogen-containing group and a silicon-containing group, and they may be bonded to one another to from a ring, but at least one R is not a hydrogen atom, and
in a skeleton of the ring formed by bonding of plural R to one another may be contained a double bond, and when two or more $C^a$ to each of which $COOR^1$ is bonded are contained in the skeleton of the ring, the number of carbon atoms to constitute the skeleton of the ring is 5 to 10;

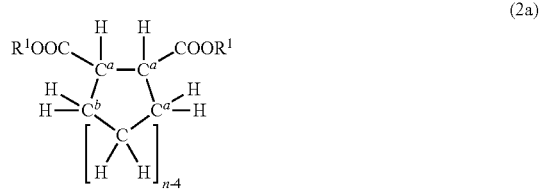

(2a)

wherein n is an integer of 5 to 10, and
$R^1$ is each independently a monovalent hydrocarbon group of 1 to 20 carbon atoms, and a single bond (except $C^a$—$C^a$ bond and $C^a$—$C^b$ bond) in the cyclic skeleton may be replaced with a double bond.

5. An olefin polymerization catalyst comprising:
the solid titanium catalyst component (I) of claim 1, and
an organometallic compound (II) containing a metal atom selected from the group 1, the group 2 and the group 13 of the periodic table.

6. The olefin polymerization catalyst as claimed in claim 5, further comprising an electron donor (III), wherein the electron donor is an organosilicon compound.

7. An olefin polymerization process comprising polymerizing an olefin in the presence of the olefin polymerization catalyst of claim 5.

8. An olefin polymerization process comprising polymerizing an olefin in the presence of the olefin polymerization catalyst of claim 6.

9. The solid titanium catalyst component (I) as claimed in claim 1, wherein the combining molar ratio of the cyclic ester compound (a) to the cyclic ester compound (b) is 50-85% by mol.

10. The solid titanium catalyst component (I) as claimed in claim 1, wherein the combining molar ratio of the cyclic ester compound (a) to the cyclic ester compound (b) is 50-80% by mol.

* * * * *